US012592801B1

(12) United States Patent
Park et al.

(10) Patent No.: US 12,592,801 B1
(45) Date of Patent: Mar. 31, 2026

(54) METHODS FOR APPLYING SEPARATE SRS CONFIGURATIONS FOR UL TX ON SBFD AND NON-SBFD SYMBOLS

(71) Applicant: InterDigital Patent Holdings, Inc., Wilmington, DE (US)

(72) Inventors: Jonghyun Park, Syosset, NY (US); Moon IL Lee, Melville, NY (US); Nazli Khan Beigi, Longueuil (CA); Virgile Garcia, Antibes (FR); Aata El Hamss, Laval (CA); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/902,399

(22) Filed: Sep. 30, 2024

(51) Int. Cl.
H04L 5/00 (2006.01)
H04L 5/14 (2006.01)
(Continued)

(52) U.S. Cl.
CPC .............. H04L 5/0051 (2013.01); H04L 5/14 (2013.01); H04W 16/28 (2013.01);
(Continued)

(58) Field of Classification Search
CPC ......... H04L 5/0051; H04L 5/14; H04L 25/22; H04W 76/20; H04W 36/00; H04W 40/36; H04W 52/02; H04W 72/231; H04W 72/23; H04W 72/232; H04W 16/28; H04W 74/0833; H04W 74/0836; H04W 74/0838; H04B 3/20; H04B 7/005; H04Q 3/00
See application file for complete search history.

(56) References Cited

U.S. PATENT DOCUMENTS

2021/0120500 A1* 4/2021 Zhou .................... H04B 17/102
2022/0103324 A1* 3/2022 Ly ......................... H04L 5/0048
(Continued)

FOREIGN PATENT DOCUMENTS

WO 2024172907 A1 8/2024

OTHER PUBLICATIONS

Moderator (CATT), "Summary #2 of SBFD TX/RX/measurement procedures," 3GPP TSG RAN WG1 #117, R1-2405423, Fukuoka City, Fukuoka, Japan (May 20-24, 2024).

*Primary Examiner* — Brian T Le
(74) *Attorney, Agent, or Firm* — VOLPE KOENG

(57) ABSTRACT

Methods for uplink (UL) sounding reference signal (SRS) transmissions on subband-overlapping full-duplex (SBFD) symbols are provided herein. A method performed by a wireless transmit/receive unit (WTRU) includes receiving configuration information indicating one or more SRS resource sets and a plurality of transmission configuration indication (TCI) states, and receiving second configuration information indicating one or more TCI codepoints. One of the TCI codepoints is associated with a first and a second TCI state. The WTRU determines the TCI codepoint is to be applied, and that the first and the second TCI state are associated with a non-SBFD mode of operation and an SFBD mode of operation, respectively. The WTRU transmits an SRS using a transmission occasion of one of the SRS resource sets and, based on whether non-SBFD or SBFD operation is used, uses the first or the second TCI state.

18 Claims, 12 Drawing Sheets

(51) Int. Cl.
  *H04W 16/28*    (2009.01)
  *H04W 72/231*   (2023.01)
  *H04W 74/0833*  (2024.01)
  *H04W 76/20*    (2018.01)

(52) U.S. Cl.
  CPC ..... *H04W 72/231* (2023.01); *H04W 74/0833*
      (2013.01); *H04W 76/20* (2018.02)

(56)                References Cited

U.S. PATENT DOCUMENTS

2023/0276504 A1 *  8/2023  Kim .................. H04W 74/0833
                                             370/329
2025/0031211 A1 *  1/2025  Wu ....................... H04L 5/0053

* cited by examiner

Figure 1C:
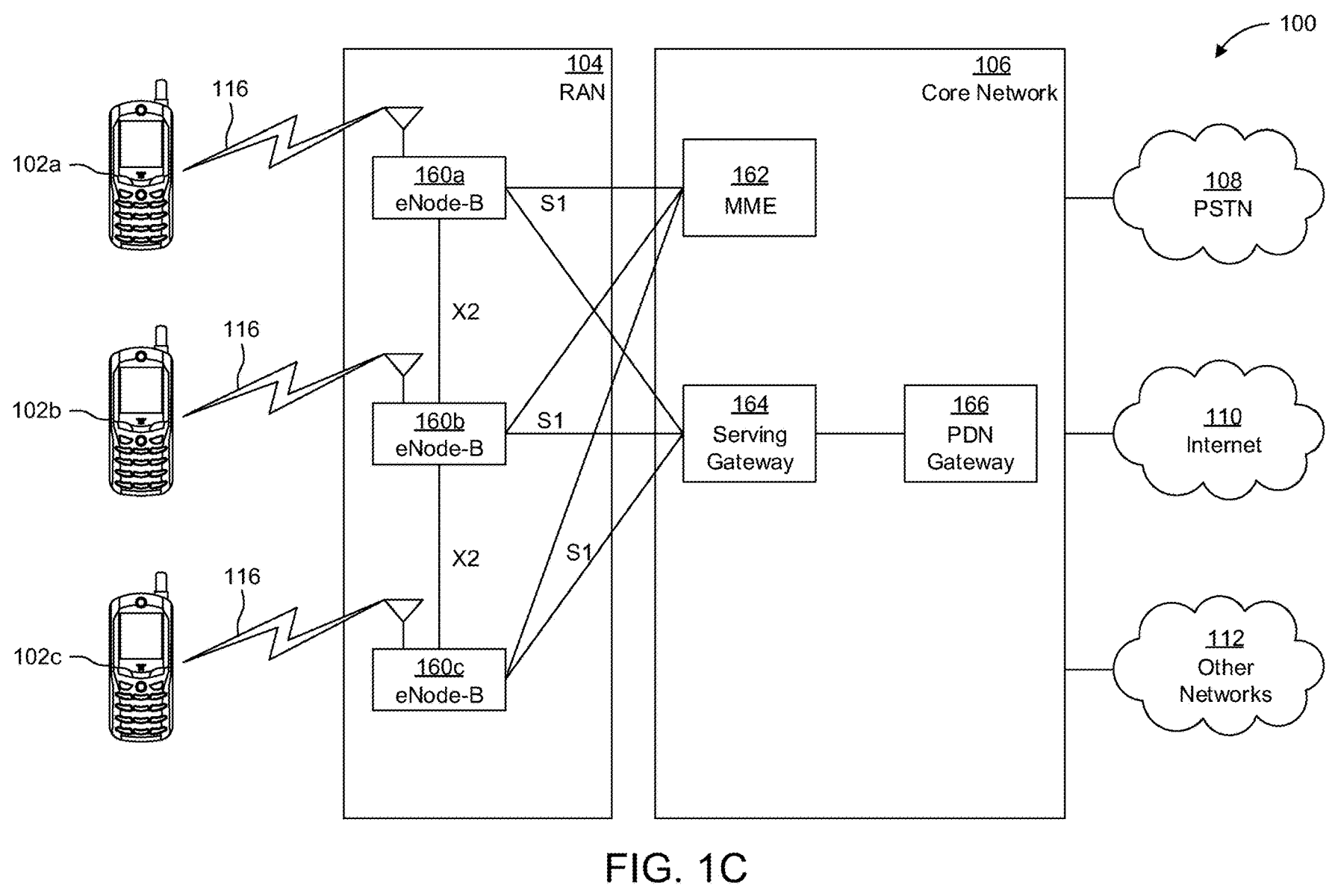

100

108
PSTN

110
Internet

112
Other
Networks

106
Core Network

166
PDN
Gateway

162
MME

164
Serving
Gateway

104
RAN

S1

S1

S1

160a
eNode-B

X2

160b
eNode-B

X2

160c
eNode-B

```
SRS-ResourceSet ::=        SEQUENCE {
srs-ResourceSetId          SRS-ResourceSetId,
srs-ResourceIdList         SEQUENCE (SIZE (1..maxNrofSRS-ResourcesPerSet)) OF SRS-ResourceId    OPTIONAL, -- Cond Setup
resourceType               CHOICE {
  aperiodic                  SEQUENCE {
    aperiodicSRS-ResourceTrigger   INTEGER (1..maxNrof SRS-TriggerStates-1),
    csi-RS                         NZP-CSI-RS-ResourceId                                         OPTIONAL, -- Cond NonCode
    slotOffset                     INTEGER (1..32)                                               OPTIONAL, -- Need S
    ...,
    [[
    aperiodicSRS-Resource TriggerList   SEQUENCE (SIZE (1..maxNrof SRS-TriggerStates-2))
                                          OF INTEGER (1..maxNrofSRS-TriggerStates-1)             OPTIONAL, -- Need M
    ]]
  },
  semi-persistent            SEQUENCE {
    associated CSI-RS              NZP-CSI-RS-ResourceId                                         OPTIONAL, -- Cond NonCode
    ...
  },
  Periodic                   SEQUENCE {
    associated CSI-RS              NZP-CSI-RS-ResourceId                                         OPTIONAL, -- Cond NonCode
    ...
  }
},
Usage                      ENUMERATED {beamManagement, codebook, nonCodebook, antennaSwitching},
Alpha                      Alpha                                                                OPTIONAL, -- Need S
Po                         INTEGER (-202..24)                                                   OPTIONAL, -- Cond Setup
pathlossReferenceRS        PathlossReference RS-Config                                          OPTIONAL, -- Need M
srs-PowerControlAdjustment States   ENUMERATED { same As Fci2, separate ClosedLoop}            OPTIONAL, -- Need S
...,
[[
pathlossReference RSList-r16    Setup Release { Pathloss Reference RSList-r16}                  OPTIONAL, -- Need M
]],
[[
usage PDC-r17                   ENUMERATED {true}                                               OPTIONAL, -- Need R
availableSlotOffsetList-r17     SEQUENCE (SIZE (1..4)) OF AvailableSlotOffset-r17               OPTIONAL, -- Need R
followUnifiedTCI-StateSRS-r17   ENUMERATED {enabled}                                            OPTIONAL, -- Need R
]],
[[
applyIndicatedTCI-State-r18     ENUMERATED {first, second}                                      OPTIONAL, -- Cond Follow[
[
}
```

FIG. 6

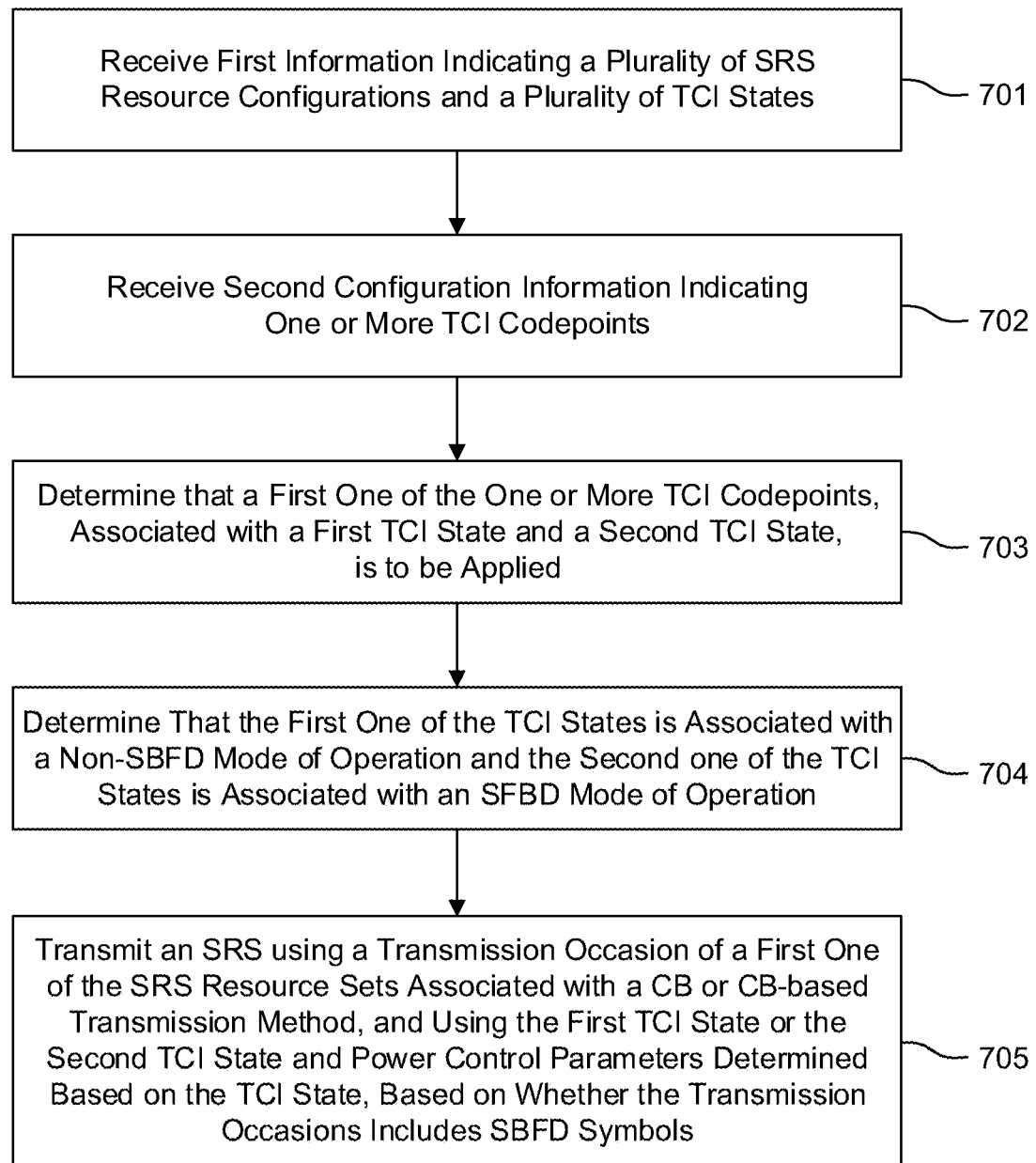

Receive First Information Indicating a Plurality of SRS
Resource Configurations and a Plurality of TCI States — 701

Receive Second Configuration Information Indicating
One or More TCI Codepoints — 702

Determine that a First One of the One or More TCI Codepoints,
Associated with a First TCI State and a Second TCI State,
is to be Applied — 703

Determine That the First One of the TCI States is Associated with
a Non-SBFD Mode of Operation and the Second one of the TCI
States is Associated with an SFBD Mode of Operation — 704

Transmit an SRS using a Transmission Occasion of a First One
of the SRS Resource Sets Associated with a CB or CB-based
Transmission Method, and Using the First TCI State or the
Second TCI State and Power Control Parameters Determined
Based on the TCI State, Based on Whether the Transmission
Occasions Includes SBFD Symbols — 705

FIG. 7

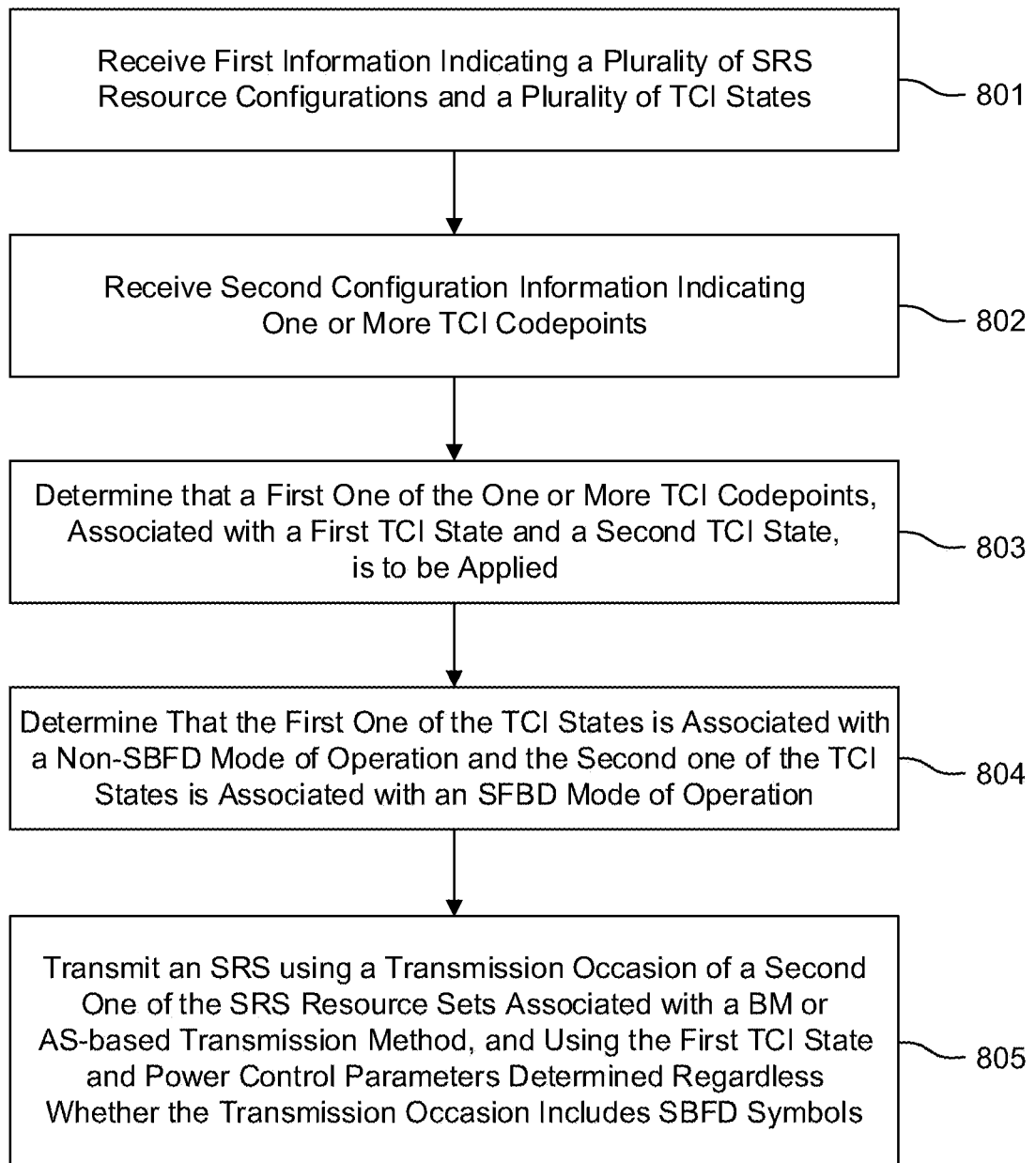

Receive First Information Indicating a Plurality of SRS
Resource Configurations and a Plurality of TCI States — 801

Receive Second Configuration Information Indicating
One or More TCI Codepoints — 802

Determine that a First One of the One or More TCI Codepoints,
Associated with a First TCI State and a Second TCI State,
is to be Applied — 803

Determine That the First One of the TCI States is Associated with
a Non-SBFD Mode of Operation and the Second one of the TCI
States is Associated with an SFBD Mode of Operation — 804

Transmit an SRS using a Transmission Occasion of a Second
One of the SRS Resource Sets Associated with a BM or
AS-based Transmission Method, and Using the First TCI State
and Power Control Parameters Determined Regardless
Whether the Transmission Occasion Includes SBFD Symbols — 805

FIG. 8

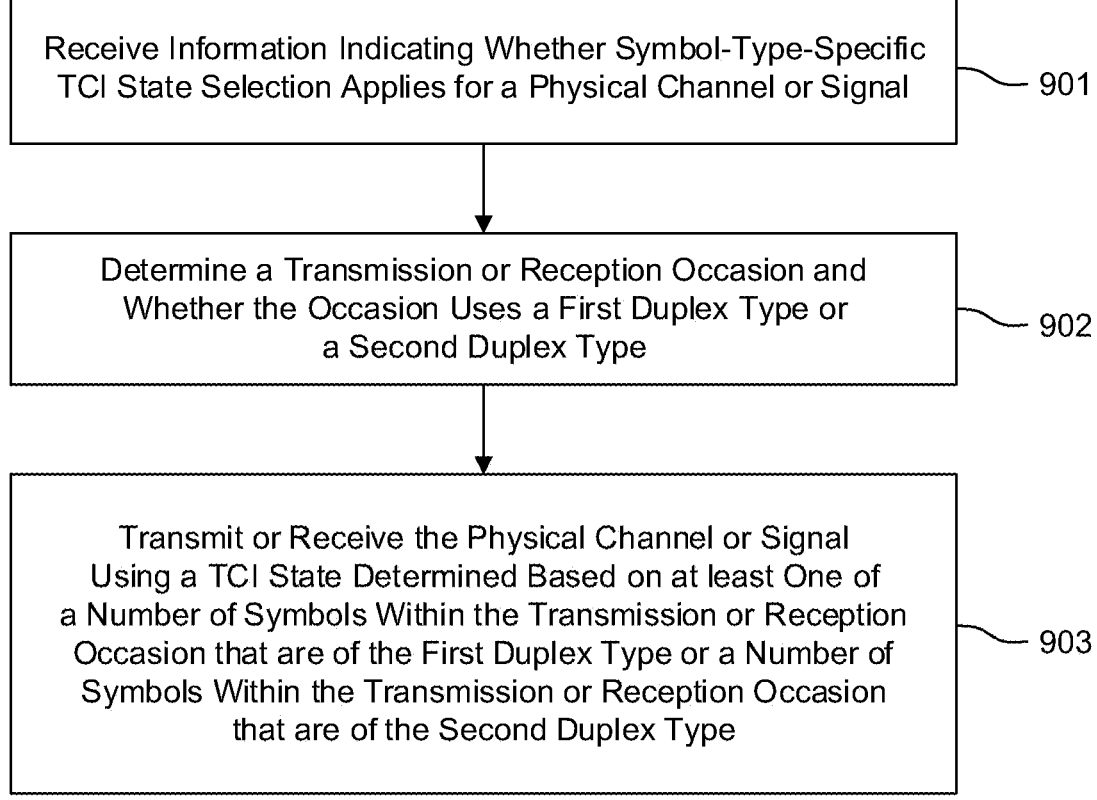

Receive Information Indicating Whether Symbol-Type-Specific TCI State Selection Applies for a Physical Channel or Signal    901

Determine a Transmission or Reception Occasion and Whether the Occasion Uses a First Duplex Type or a Second Duplex Type    902

Transmit or Receive the Physical Channel or Signal Using a TCI State Determined Based on at least One of a Number of Symbols Within the Transmission or Reception Occasion that are of the First Duplex Type or a Number of Symbols Within the Transmission or Reception Occasion that are of the Second Duplex Type    903

FIG. 9

METHODS FOR APPLYING SEPARATE SRS CONFIGURATIONS FOR UL TX ON SBFD AND NON-SBFD SYMBOLS

BACKGROUND

Duplex operation in wireless networks operating in accordance with Fifth Generation (5G) New Radio (NR) standards may serve as a foundation for improving conventional time division duplexing (TDD) operation by enhancing uplink (UL) coverage, improving capacity, and reducing latency. Conventional TDD operation may be carried out by splitting the time domain between the uplink and downlink directions. The feasibility of full duplex operation, or more specifically, subband non-overlapping full duplex (SBFD) operation at the base station within a conventional TDD band is being investigated for Release 19 standards.

The realization of SBFD operation may be subject to the resolution of challenges arising due to cross-link interference (CLI). In an SBFD (or dynamic/flexible TDD) framework, a potential aggressor cell may switch from UL to downlink (DL) or vice-versa, causing CLI on potential victim base stations and WTRUs. When UL-to-DL CLI occurs, UL transmissions from aggressor WTRUs may cause directional CLI at the victim WTRUs. CLI may be measured at both the victim and/or aggressor WTRUs.

SUMMARY

Methods for uplink (UL) sounding reference signal (SRS) transmissions on subband non-overlapping full-duplex (SBFD) symbols are provided herein. A method performed by a wireless transmit/receive unit (WTRU) includes receiving configuration information indicating one or more SRS resource sets and a plurality of transmission configuration indication (TCI) states, and receiving second configuration information indicating one or more TCI codepoints. One of the TCI codepoints is associated with a first and a second TCI state. The WTRU determines the TCI codepoint is to be applied, and that the first and the second TCI state are associated with a non-SBFD mode of operation and an SFBD mode of operation, respectively. The WTRU transmits an SRS using a transmission occasion of one of the SRS resource sets and, based on whether non-SBFD or SBFD operation is used, uses the first or the second TCI state.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

FIG. 6 is a diagram illustrating an example of SRS resource set configuration information, as may be carried in an RRC information element, such as SRS-Config;

FIG. 7 is a flowchart illustrating a method for applying separate SRS configurations for UL transmissions on SBFD symbols;

FIG. 8 is a flowchart illustrating another method for applying separate SRS configurations for UL transmissions on SBFD symbols; and FIG. 9 is a flowchart illustrating a method performed by a WTRU for applying separate configurations for UL or DL transmissions based on symbols within a transmission or reception occasion.

DETAILED DESCRIPTION

Figure 1A:
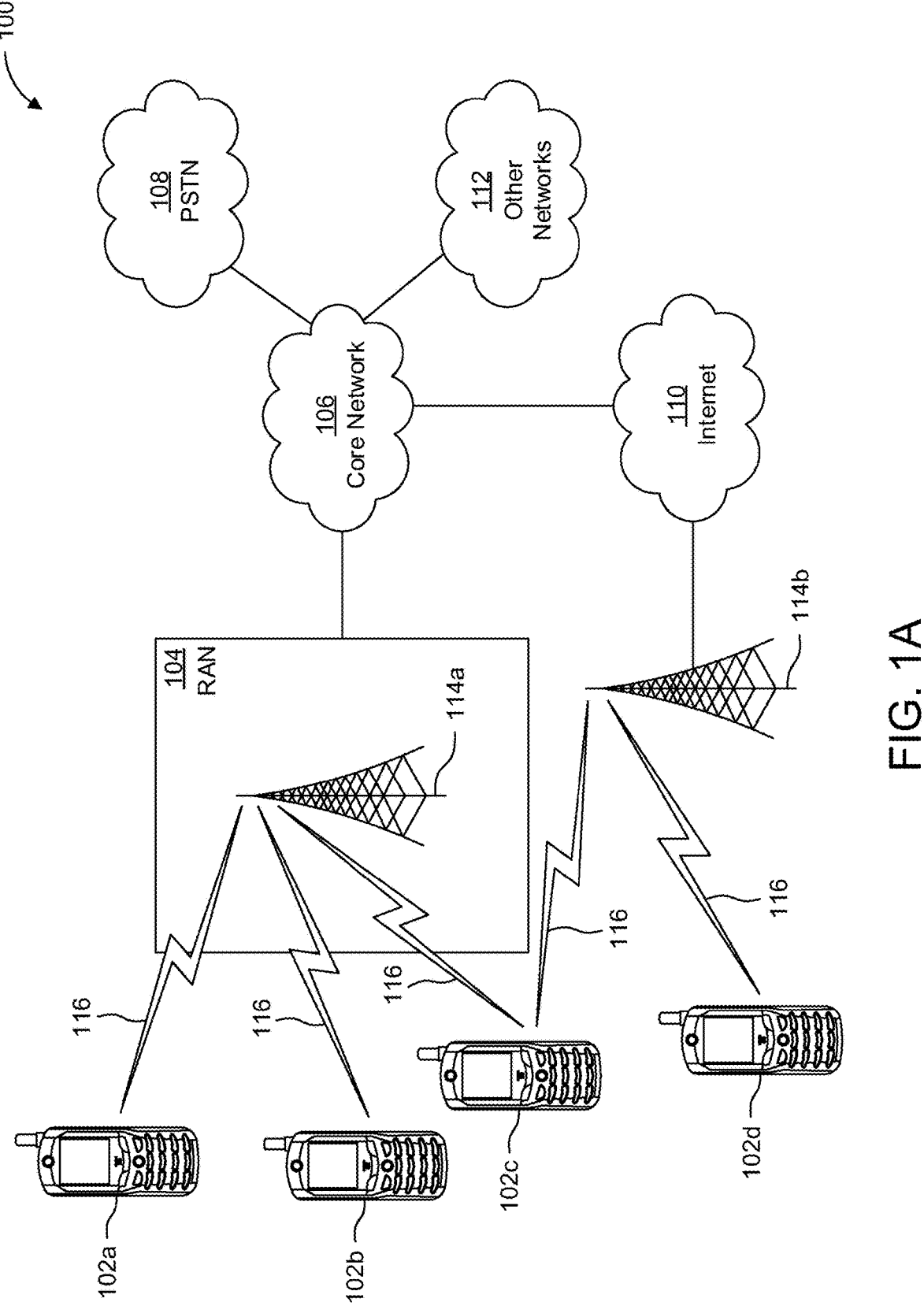
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
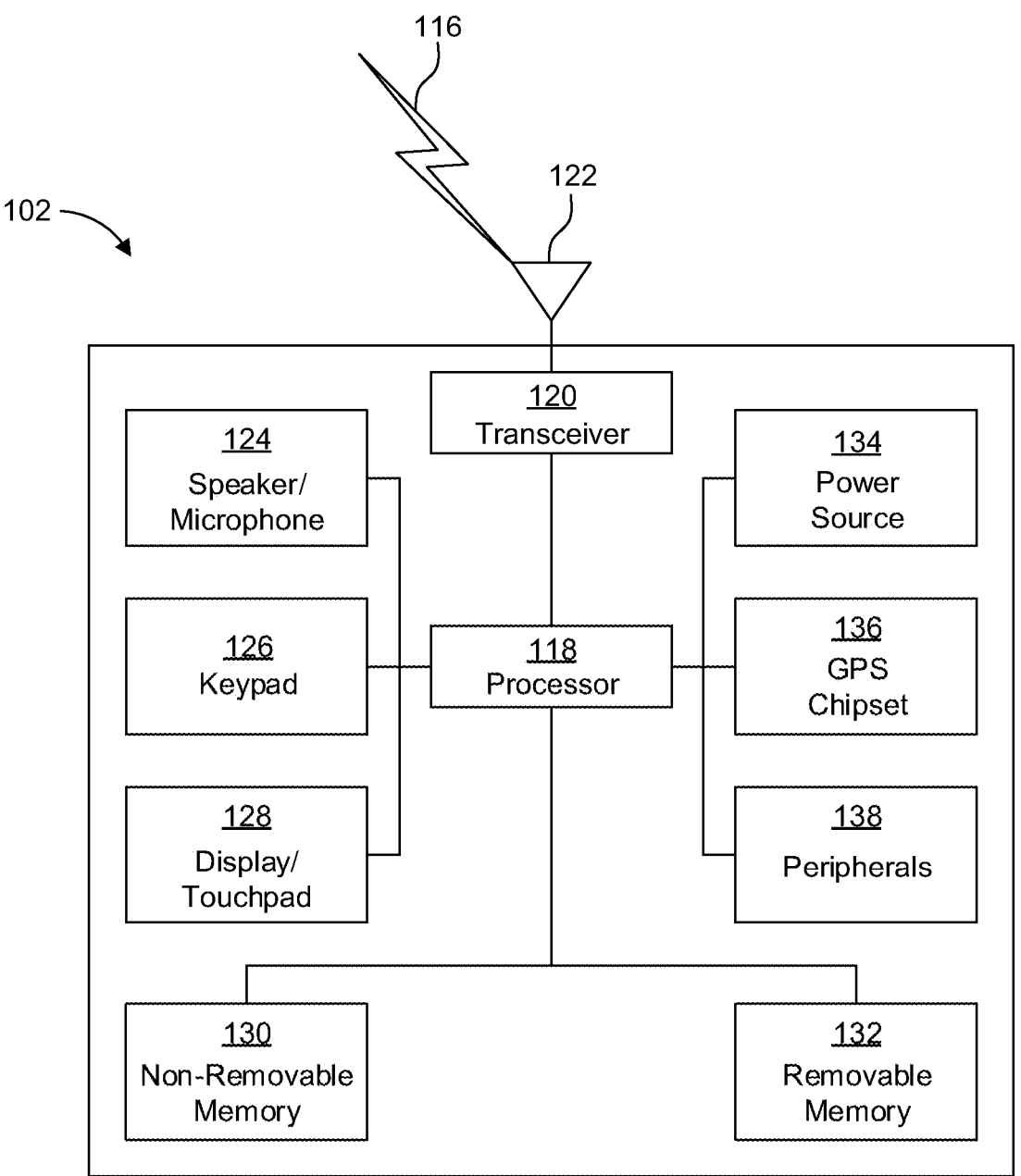
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
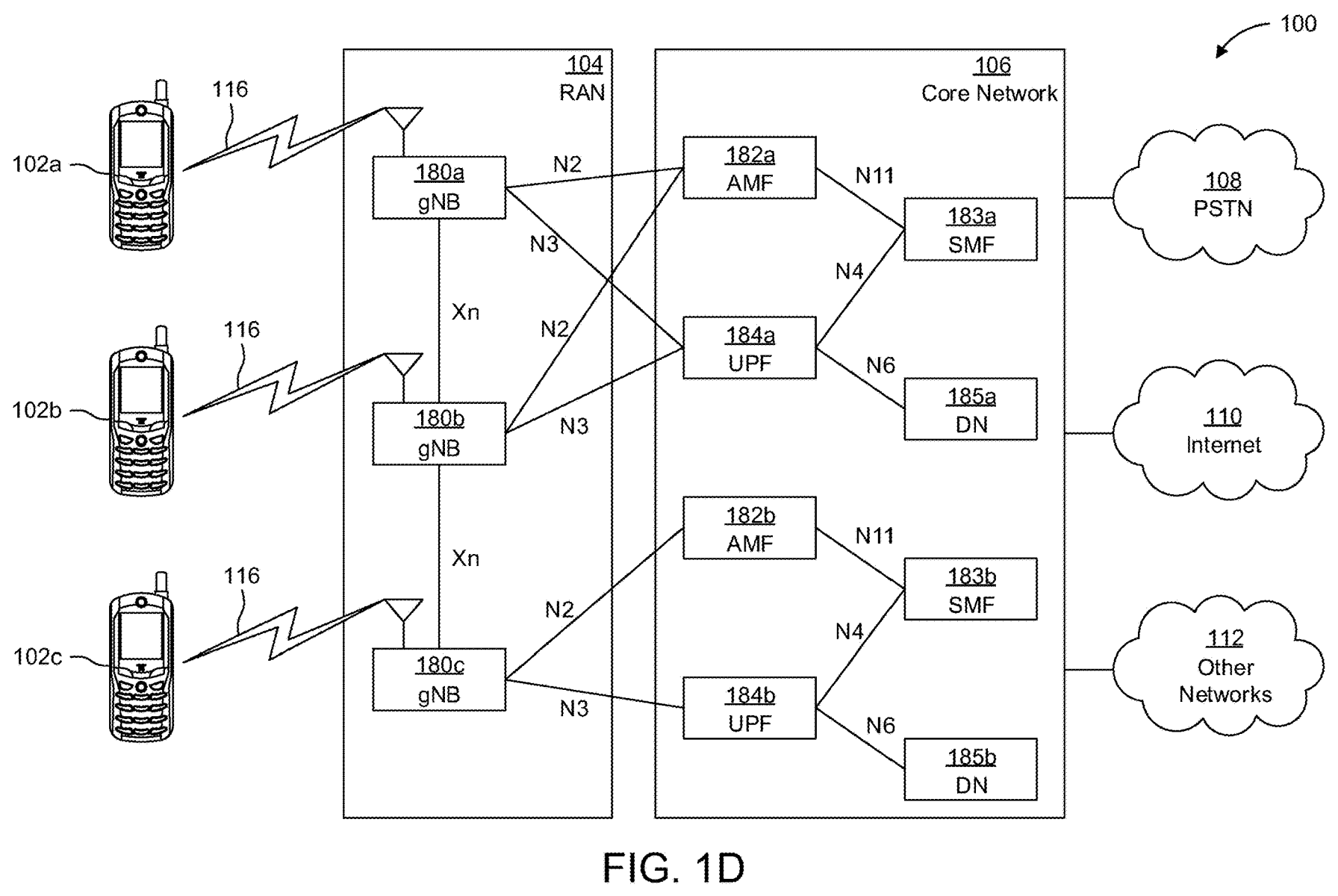

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In the following description, the acronym "CG" may refer to "Configured Grant." The acronym "DG" may refer to "Dynamic Grant." The acronym "MAC CE" may refer to "MAC Control Element." The acronym "ACK" may refer to "Acknowledgement." The acronym "BLER" may refer to "Block Error Rate." The acronym "BWP" may refer to "Bandwidth Part." The acronym "C-JT" may refer to "Coherent Joint Transmission." The acronym "CP" may refer to "Cyclic Prefix." The acronym "CP-OFDM" may refer to "Conventional OFDM (relying on cyclic prefix)." The acronym "CQI" may refer to "Channel Quality Indicator." The acronym "CRC" may refer to "Cyclic Redundancy Check." The acronym "CSI" may refer to "Channel State Information." The acronym "DAI" may refer to "Downlink Assignment Index." The acronym "DCI" may refer to "Downlink Control Information." The acronym "DL" may refer to "Downlink." The acronym "DM-RS" may refer to "Demodulation Reference Signal." The acronym "DRB" may refer to "Data Radio Bearer." The acronym "HARQ" may refer to "Hybrid Automatic Repeat Request." The acronym "LTE" may refer to "Long Term Evolution, e.g., from 3GPP LTE R8 and up." The acronym "NACK" may refer to "Negative ACK." The acronym "mTRP" may refer to "Multiple TRP." The acronym "MCS" may refer to "Modulation and Coding Scheme." The acronym "MIMO" may refer to "Multiple Input Multiple Output." The acronym "NC-JT" may refer to "Non-Coherent Joint Transmission." The acronym "NR" may refer to "New Radio." The acronym "OFDM" may refer to "Orthogonal Frequency-Division Multiplexing." The acronym "PHY" may refer to "Physical Layer." The acronym "PMI" may refer to "Precoding Matrix Indicator." The acronym "PRACH" may refer to "Physical Random Access Channel." The acronym "PSS" may refer to "Primary Synchronization Signal." The acronym "RACH" may refer to "Random Access Channel (or procedure)." The acronym "RAR" may refer to "Random Access Response." The acronym "RF" may refer to "Radio Front End." The acronym "RLF" may refer to "Radio Link Failure." The acronym "RLM" may refer to "Radio Link Monitoring." The acronym "RNTI" may refer to "Radio Network Identifier." The acronym "RRC" may refer to "Radio Resource Control." The acronym "RRM" may refer to "Radio Resource Management." The acronym "RS" may refer to "Reference Signal." The acronym "RSRP" may refer to "Reference Signal Received Power." The acronym "RSSI" may refer to "Received Signal Strength Indicator." The acronym "SDU" may refer to "Service Data Unit." The acronym "SRS" may refer to "Sounding Reference Signal." The acronym "SS" may refer to "Synchronization Signal." The acronym "SSS" may refer to "Secondary Synchronization Signal." The acronym "SPS" may refer to "Semi-persistent Scheduling." The acronym "SUL" may refer to "Supplemental Uplink." The acronym "TB" may refer to "Transport Block." The acronym "TBS" may refer to "Transport Block Size." The acronym "TRP" may refer to "Transmission/Reception Point." The acronym "UL" may refer to "Uplink." The acronym "URLLC" may refer to "Ultra-Reliable and Low Latency Communications." The acronym "WLAN" may refer to "Wireless Local Area Networks and related technologies (IEEE 802.xx domain)." The acronym "TDD" may refer to "Time Division Duplex." The acronym "XDD" may refer to "Cross Division Duplex." The acronym "FD" may refer to "Full Duplex." The acronym "HD" may refer to "Half Duplex." The acronym "IAB" may refer to "Integrated Access and Backhaul." The acronym "SI" may refer to "Self-Interference." The acronym "CLI" may refer to "Cross-Link Interference." The acronym "PDSCH" may refer to "Physical Downlink Shared Channel." The acronym "PUSCH" may refer to "Physical Uplink Shared Channel." The acronym "PDCCH" may refer to "Physical Downlink Control Channel." The acronym "PUCCH" may refer to "Physical Uplink Control Channel." The acronym "CORESET" may refer to "Control Resource Set." The acronym "UE" may refer to "User Equipment." The acronym "PC" may refer to "Power Control." The acronym "RB" may refer to "Resource Block." The acronym "L1-RSRP" may refer to "Layer 1 RSRP." The acronym "cri-RSRP" may refer to "CSI-RS Resource Indicator RSRP." The acronym "SSB" may refer to "Synchronization Signal Block." The acronym "SINR" may refer to "Signal-to-Interference-plus-Noise Ratio." The acronym "TCI" may refer to "Transmission Configuration Indicator." The acronym "OLPC" may refer to "Open Loop Power Control." The acronym "CLPC" may refer to "Closed Loop Power Control." The acronym "PL" may refer to "Pathloss." The acronym "P-MPR" may refer to "Power Management-Maximum Power Reduction." The acronym "PH" may refer to "Power Headroom." The acronym "PHR" may refer to "Power Headroom Reporting." The acronym "UCI" may refer to "Uplink Control Information." The acronym "SRI" may refer to "SRS Resource Indicator." The acronym "SL" may refer to "Sidelink" or alternatively, "Side Link." The acronym "CRS" may refer to "Cell-specific RS."

Figure 2:
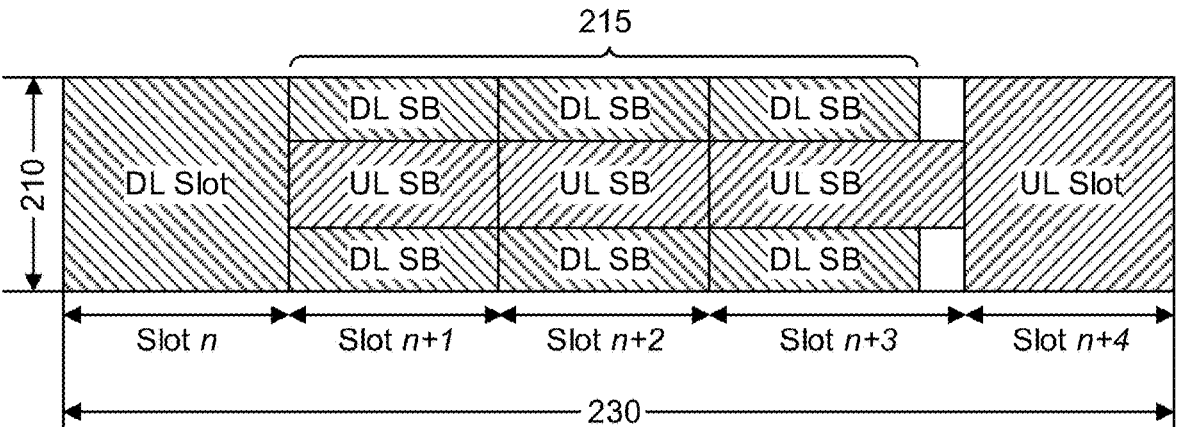
FIG. 2 is a diagram illustrating an example of an SBFD configuration in a TDD framework.

FIG. 2 is a diagram illustrating an example of an SBFD configuration in a TDD framework. In the example shown in FIG. 2, a TDD cycle may be defined within a time duration 220 that extends over five slots and are allocated within a bandwidth part or component carrier 210. The SBFD resources as shown are defined within three slots, slot n+1, slot n+2, and slot n+3, denoted collectively by the time period 215. The SBFD resource may encompass three subbands within the bandwidth part or component carrier 210. The example configuration shown in FIG. 2 is a downlink-uplink-downlink (DUD) configuration, reflecting the presence of two DL subbands with a single UL subband between them. The SBFD slots are preceded by a DL slot and are followed respectively by a flexible slot and an UL slot. In some examples not shown in FIG. 2, the WTRU may be configured with an UD configuration, where an UL subband is configured with higher frequencies followed by a DL subband with lower frequencies. In another example, the WTRU may be configured with DU configuration, where a DL subband is configured with higher frequencies followed by an UL subband with lower frequencies. These examples should be understood as non-limiting examples of the SBFD configurations and parameters that may be included in SBFD configurations. One or more of those configurations may be included. Other configurations may be included.

Figure 3:
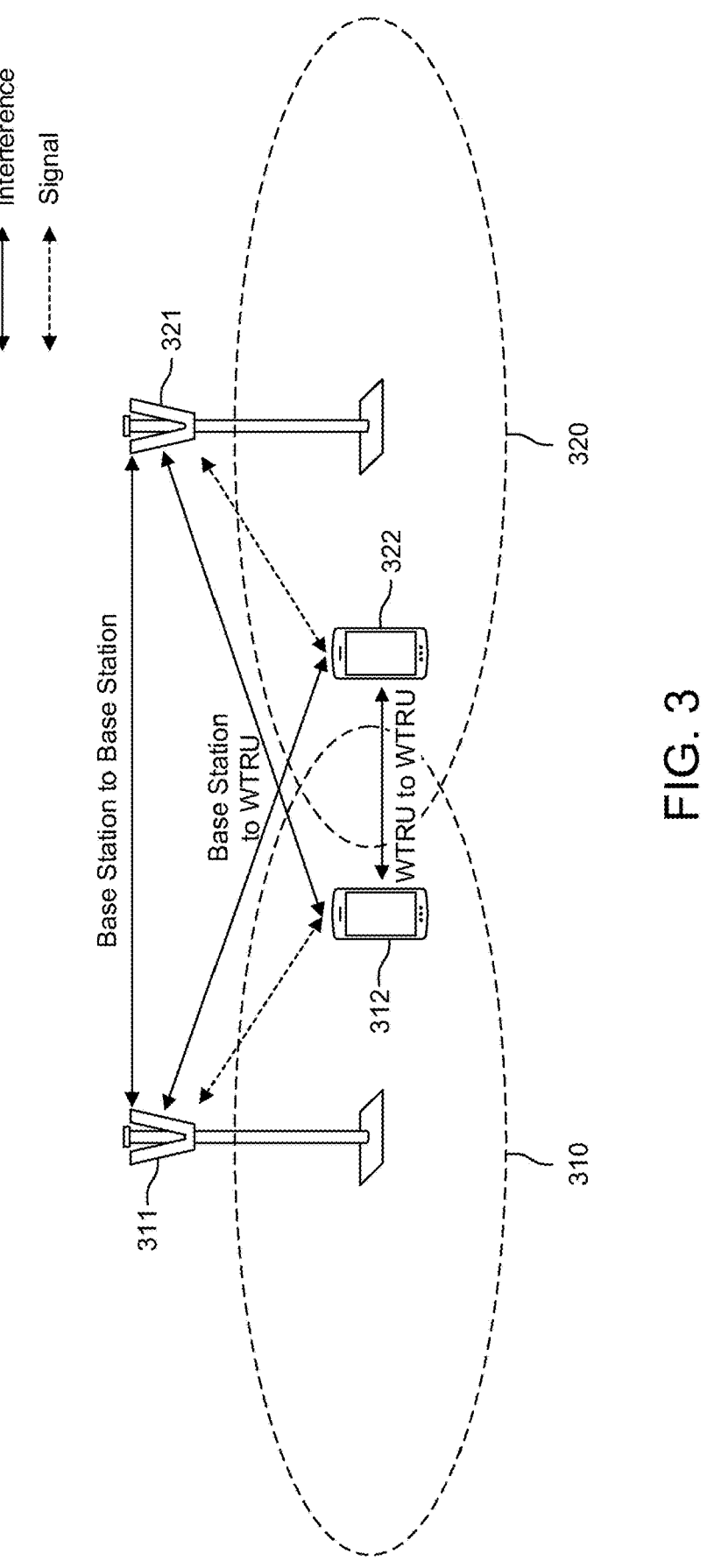
FIG. 3 is a diagram illustrating the interference scenarios impacting communication between devices in a network implementing TDD operation.

FIG. 3 is a diagram illustrating the interference scenarios impacting communication between devices in a network implementing TDD operation. In the example shown in FIG. 3, the network includes a first base station 311 providing coverage to a first WTRU 312 in a first cell 310 and a second base station 321 providing coverage to a second WTRU 322 in a second cell 320. The base stations 311 and 321 may be, for example, nodeBs (e.g., gNBs or eNBs), TRPs, or remote radio heads, or other types of network infrastructure devices. It should be understood that the network may include other (e.g., additional) base stations, WTRUs, and/or cells. In the example shown inn FIG. 3, the base station 311 and WTRU 312 may be attempting to communicate, while the base station 321 and WTRU 322 may also be attempting to communicate during overlapping time intervals. Cross-link interference may occur due to various reasons, including imperfect synchronization, imperfect channel estimation, or adjacent channel interference in the case of closely spaced frequency channels, when there might be interference between UL and DL transmissions in neighboring channels. In the case of TDD operation, particularly when SBFD operation is utilized, cross-link interference may occur in one cell when another cell (e.g., WTRUs and/or base station(s) in one cell) switches between UL and DL transmit directions during SBFD slots. For example, CLI between WTRUs, between base stations, and/or between base station(s) and WTRU(s) may occur.

In an SBFD system, across SBFD symbols and non-SBFD symbols, a WTRU and/or network infrastructure (such as a base station, nodeB or TRP) may need to determine whether separated beam/TCI configurations are applied or not, in consideration of the effects of interference in different scenarios on the different symbol types. For example, if non-negligible self-interference is experienced by a WTRU or network infrastructure when using a DL beam on SBFD symbols, separately applying different beam/TCI information may be beneficial. In addition, a UL Tx power control (PC) mechanism may need to be separately controlled across different symbol types, e.g., due to interference across symbol types. If separate TCI states for SBFD and non-SBFD symbols are (also) configured and used, configured SRS resources (and/or resource sets) for WTRU to transmit may have ambiguous situations where for each transmission occasion the WTRU has to determine which TCI-state of the separated TCI states is to be applied, e.g., when one SRS resource (or resource set) spans across both symbol types, etc. Also, WTRU behaviors on subsequent PUSCH scheduling grant that is based on previously transmitted SRS(s), e.g., by an SRS resource indicator (SRI) and/or an SRS resource set indicator (SRSI), needs to be clearly determined and controlled by the network.

One or more of the following problems may be addressed by solutions proposed herein. One problem may be, when unified TCI framework is enabled, how to apply separated TCI and/or power control parameters in SRS transmission occasion(s). Another problem may be how to define an association with a subsequent UL transmission (e.g., a codebook-based or non-codebook-based UL, PUSCH transmission) on SBFD symbols.

The above referenced problems may be considered at least in terms of determining spatial-domain parameter(s) and/or power control parameter(s) for the UL transmission.

One set of solutions for selective TCI-state application based on a determined duplex symbol type and configured UL channel type including SRS-usage parameters, as is described in further detail herein, may be summarized briefly as follows.

When SBFD operation is enabled, a WTRU may determine to apply either a "symbol-type-specific" TCI-state (SBFD or non-SBFD) or legacy TCI-state, based on a scheduled UL channel or signal type such as SRS (further depending on its 'usage' parameter), PRACH, PUCCH, and/or PUSCH.

In some solutions, a WTRU carries out one or more of the following steps. The WTRU may receive configuration information for one or more SRS resource sets, each including one or more SRS resources, and a plurality of TCI-states. Each TCI-state of the plurality of TCI-states may be associated with a set of power control (PC) parameters (e.g., at least one of the set of parameters {P0, P_offset, alpha, a pathloss (PL)-RS, a closed-loop-index}). An SRS resource set may be associated with a usage parameter indicating at least one of {codebook-based (CB) UL, non-codebook-based (NCB) UL, 'beam management (BM)', or 'antenna switching (AS)'}.

A WTRU may receive an indication (e.g., via a MAC-CE, or other logically equivalent signaling) of one or more TCI codepoints. A first TCI codepoint of the one or more TCI codepoints may be associated with a first TCI-state and a second TCI-state (e.g., a first one and a second one of the plurality of TCI-states). The WTRU may receive a second indication (or determine) that the first TCI-state is associated with a first duplex type (e.g., non-SBFD symbol type), and the second TCI-state is associated with a second duplex type (e.g., SBFD symbol type). The WTRU may receive a third indication (or determine) that an SRS resource set is configured to be applied by an indicated TCI codepoint of the one or more TCI codepoints and/or based on the second indication.

The WTRU may receive a control command (e.g., via a DCI, or via other logically equivalent signaling) indicating the first TCI codepoint.

The WTRU may determine that a first SRS resource set is associated with at least one of CB or NCB-based transmission methods and whether a transmission occasion of an SRS resource (of the first SRS resource set) is based on the first duplex type (e.g., on non-SBFD symbols) or the second duplex type (e.g., on SBFD symbols).

If the transmission occasion falls on non-SBFD symbols, the WTRU may transmit an SRS using the first TCI-state and using a determined transmission power based on a set of PC parameters associated with the first TCI-state.

If the transmission occasion falls on SBFD symbols, the WTRU may transmit an SRS using the second TCI-state and using a determined transmission power based on a set of PC parameters associated with the second TCI-state.

In some solutions, the WTRU may determine a second SRS resource set is associated with at least one of BM or AS-based transmission methods. Based on the determination, the WTRU may transmit an SRS using the first TCI-state and a determined transmission power based on a set of PC parameters associated with the first TCI-state, when the transmission occasion of the SRS is on either non-SBFD or SBFD symbols (e.g., regardless of symbol type).

The WTRU may transmit a PRACH using the first TCI-state and a determined transmission power based on a set of PC parameters associated with the first TCI-state, when the transmission occasion of the PRACH is on either non-SBFD or SBFD symbols (e.g., regardless of symbol type).

Further details regarding the proposed solutions are provided herein. Aspects common to all solutions are described in the following paragraphs.

The notation of terminology used herein may be described as follows. Hereinafter, 'a' and 'an' and similar phrases are to be interpreted as 'one or more' and 'at least one'. Similarly, any term which ends with the suffix '(s)' is to be interpreted as 'one or more' and 'at least one'. The term 'may' is to be interpreted as 'may, for example'. A symbol '/' (e.g., forward slash) may be used herein to represent 'and/or', where for example, 'A/B' may imply 'A and/or B'.

Hereinafter, the term "subband" is used to refer to a frequency-domain resource and may be characterized by at least one of the following: a set of resource blocks (RBs); a set of resource block sets (RB sets), e.g. when a carrier has intra-cell guard bands; a set of interlaced resource blocks; a bandwidth part, or portion thereof; or a carrier, or portion thereof. For example, a subband may be characterized by a starting RB and number of RBs for a set of contiguous RBs within a bandwidth part. A subband may also be defined by the value of a frequency-domain resource allocation field and bandwidth part index.

Hereinafter, the term "XDD" is used to refer to a subband-wise duplex (e.g., either UL or DL being used per subband) and may be characterized by at least one of the following methods: Cross Division Duplex (e.g., subband-wise FDD within a TDD band); subband-based full duplex (e.g., full duplex as both UL and DL are used/mixed on a symbol/slot, but either UL or DL being used per subband on the symbol/ slot); frequency-domain multiplexing (FDM) of DL/UL transmissions within a TDD spectrum; subband non-over-lapping full duplex (SBFD) (e.g., non-overlapped sub-band full-duplex); a full duplex method other than a same-frequency (e.g., spectrum sharing, subband-wise-over-lapped) full duplex; or an advanced duplex method, e.g., other than (pure) TDD or FDD.

Hereinafter, the term "dynamic and/or flexible TDD" may be used to refer to a TDD system/cell which may dynami-cally (and/or flexibly) change/adjust/switch a communica-tion direction (e.g., a downlink, an uplink, or a sidelink, etc.) on a time instance (e.g., slot, symbol, subframe, and/or the like). In some examples, in a system employing dynamic/ flexible TDD, a component carrier (CC) or a bandwidth part (BWP) may have one single type among 'D', 'U', and 'F' on a symbol/slot, based on an indication by a group-common (GC)-DCI (e.g., format 2_0) including a slot format indicator (SFI), and/or based on tdd-UL-DL-config-common/dedicated configurations. On a given time instance/slot/symbol, a first base station (e.g., cell, TRP) employing dynamic/flexible TDD may transmit a downlink signal to a first WTRU being communicated/associated with the first base station based on a first SFI and/or tdd-UL-DL-config configured/indicated by the first base station, and a second base station (e.g., cell, TRP) employing dynamic/flexible TDD may receive an uplink signal transmitted from a second WTRU being communicated/associated with the second base station based on a second SFI and/or tdd-UL-DL-config configured/indicated by the second base station. In some examples, the first WTRU may determine that the reception of the downlink signal is being interfered by the uplink signal, where the interference caused by the uplink signal may refer to a WTRU-to-WTRU cross-link interference (CLI).

The term "beam" may be understood as described in the following paragraphs. A WTRU may transmit or receive a physical channel or reference signal according to at least one spatial domain filter. The term "beam" may be used to refer to a spatial domain filter.

The WTRU may transmit a physical channel or signal using the same spatial domain filter as the spatial domain filter used for receiving an RS (such as CSI-RS) or a SS block. The WTRU transmission may be referred to as a "target", and the received RS or SS block may be referred to as "reference" or "source". In such case, the WTRU may be said to transmit the target physical channel or signal according to a spatial relation with a reference to such RS or SS block.

The WTRU may transmit a first physical channel or signal according to the same spatial domain filter as the spatial domain filter used for transmitting a second physical channel or signal. The first and second transmissions may be referred to as "target" and "reference" (or "source"), respectively. In such case, the WTRU may be said to transmit the first (target) physical channel or signal according to a spatial relation with a reference to the second (reference) physical channel or signal.

A spatial relation may be implicit, configured by RRC or signaled by MAC CE or DCI or another logically equivalent signal or message. For example, a WTRU may implicitly transmit PUSCH and DM-RS of PUSCH according to the same spatial domain filter as an SRS indicated by an SRS resource indicator (SRI) indicated in DCI or configured by RRC. In another example, a spatial relation may be configured by RRC for an SRI or signaled by MAC CE for a PUCCH. Such spatial relation may also be referred to as a "beam indication".

The WTRU may receive a first (target) downlink channel or signal according to the same spatial domain filter or spatial reception parameter as a second (reference) downlink channel or signal. For example, such association may exist between a physical channel such as PDCCH or PDSCH and its respective DM-RS. At least when the first and second signals are reference signals, such association may exist when the WTRU is configured with a quasi-colocation (QCL) assumption type D between corresponding antenna ports. Such association may be configured as a transmission configuration indicator (TCI) state. A WTRU may determine or receive an indication/or configuration information indicating an association between a CSI-RS or SS block and a DM-RS by an index to a set of TCI states configured by RRC and/or signaled by MAC CE. Such indication may also be referred to as a "beam indication".

Quasi co-location (QCL) assumptions and configurations are described in the following paragraphs. A WTRU may receive transmit configuration indication (TCI) related configuration(s), e.g., including a plurality of TCI-states (e.g., an RRC-configured pool of TCI-states (e.g., as unified TCI framework), 'TCI-State' IE, 'TCI-UL-State' IE, 'spatialRelationInfo' IE, etc.). A TCI-state of the plurality of TCI-states may be associated (included) with at least one of QCL-info #1, QCL-info #2, additionalPCI, pathloss RS (PLRS)-ID, UL-PC, Timing Advance Group (TAG)-ID, where QCL-info #1 (or QCL-info #2) may include a cell-ID (e.g., serving-cell index), a BWP-ID, a RS (e.g., CSI-RS, SSB-index), and/or a QCL-type which may be one of typeA, typeB, typeC, typeD. In some examples, the PLRS-ID may be for pathloss estimation for determining a UL transmission power when a UL transmission is based on a TCI-state that is associated with the PLRS-ID. In some examples, the UL-PC (e.g., UL-PC parameter set, which may include at least one of P0, alpha, close-loop (CL)-index, power offset, etc.) may be for determining an uplink power for an UL transmission associated with the TCI-state. In some examples, the additionalPCI may be a physical cell-ID (PCID) of a neighboring (surrounding) cell that the RS (associated with the TCI-state), e.g., SSB-index (or CSI-RS) may be transmitted from, e.g., as an inter-cell beam (or RS) reference. In some examples, the WTRU may apply a timing advance value (e.g., based on received timing advance command(s) (TAC) (s) in association with the TAG-ID (e.g., of multiple TAG-IDs being configured) to a scheduled UL transmission. Regarding QCL-types, typeA may represent a set of characteristics, such as {Doppler shift, Doppler spread, average delay, delay spread}; typeB may represent a set of characteristics such as {Doppler shift, Doppler spread}; typeC may represent a set of characteristics such as {Doppler shift, average delay}, and typeD may represent a characteristic such as {Spatial Rx parameter}.

When a WTRU receives an indication or configuration of a TCI-state (e.g., applicable for a physical channel or signal) at least including a QCL-type (e.g., by typeA, typeB, typeC, or typeD) and an RS (e.g., an RS associated with the QCL-type), the WTRU may determine (e.g., derive) at least one parameter for transmission and/or reception, representing wireless channel characteristics (e.g., at least one of Doppler shift, Doppler spread, average delay, delay spread, Spatial Rx parameter) based on the indicated QCL-type, and apply the at least one parameter for transmission or reception of the physical channel or signal.

Concepts relating to unified TCI (UTCI) are described in paragraphs below. A unified TCI (e.g., a common TCI, a common beam, a common RS, etc.) may refer to a beam/RS to be (e.g., simultaneously) used for multiple physical channels/signals. The term "TCI" may at least include a TCI state that includes at least one source RS to provide a reference (e.g., supporting an assumption, by a WTRU) for determining QCL and/or spatial filter.

In some examples, a WTRU may receive (e.g., from a base station) an indication of a first unified TCI to be used/applied for both a downlink control channel (PDCCH) and a downlink shared channel (PDSCH) (e.g., and a downlink RS). The source reference signal(s) in the first unified TCI may provide common QCL information at least for WTRU-dedicated reception on the PDSCH and all (or subset of) CORESETs in a CC. In some examples, a WTRU may receive (e.g., from a base station) an indication of a second unified TCI to be used/applied for both an uplink control channel (PUCCH) and an uplink shared channel (PUSCH) (e.g., and an uplink RS). The source reference signal(s) in the second unified TCI may provide a reference for determining common UL TX spatial filter(s) at least for dynamic-grant/configured-grant based PUSCH and all (or subset of) dedicated PUCCH resources in a CC.

The WTRU may be configured with a first mode for unified TCI (e.g., SeparateDLULTCI mode, a parameter of 'unifiedTCI-StateType' set to 'separate') where an indicated unified TCI (e.g., the first unified TCI or the second unified TCI) may be applicable for either downlink (e.g., based on the first unified TCI) or uplink (e.g., based on the second unified TCI).

In some examples, a WTRU may receive (e.g., from a base station (BS), a nodeB, a TRP, etc.) an indication of a second unified TCI to be used/applied commonly for a PDCCH, a PDSCH, a PUCCH, and/or a PUSCH (as well as a DL RS and/or a UL RS).

The WTRU may be configured with a second mode for unified TCI (e.g., JointTCI mode, a parameter of 'unifiedTCI-StateType' set to 'joint') where an indicated unified TCI (e.g., the third unified TCI) may be applicable for both downlink and uplink (e.g., based on the third unified TCI).

The WTRU may determine a TCI state applicable to a transmission or reception by first determining a unified TCI state instance (e.g., TCI-state group, a group of TCI-states, a set of activated TCI-states) applicable to this transmission or reception, then determining a TCI state corresponding to the Unified TCI state instance. As used herein, the term "reception" may refer to the act, by a WTRU, a base station, a nodeB (e.g., a gNB), or a TRP of receiving a transmission. A transmission may include one or more of a PUCCH, PUSCH, SRS transmission. A reception may include one or more of a PDCCH, PDSCH, or a CSI-RS. A unified TCI state instance may also be referred to TCI state group, TCI state process, unified TCI pool, a group of TCI states, a set of time-domain instances/stamps/slots/symbols, and/or a set of frequency-domain instances/RBs/subbands, etc. A unified TCI state instance may be equivalent to or identified by a CORESET Pool identity (e.g., CORESETPoolIndex, a TRP indicator, and/or a similar indicator or index).

Hereafter, the term unified TCI may be interchangeably used with one or more of the terms unified TCI-states, unified TCI instance, TCI, or TCI-state, but remain consistent with the description herein.

A WTRU may be configured with a plurality of transmission configuration indicator (TCI) states, e.g., unified TCI (UTCI) states, each applicable for multiple channel(s)/signal(s). The multiple channel(s)/signal(s) may be configured at the WTRU (or pre-determined or defined), e.g., in a form of a list, by a higher-layer signaling (e.g., RRC and/or MAC-CE) which may include at least one of following (e.g., as a combination) forms: one or more CORESETs; one or more PDCCH candidates; one or more search spaces; one or more PDSCHs (e.g., PDSCH occasions/configurations/instances, etc.); one or more RSs (e.g., CSI-RSs, DMRSs, SSB indexes, PRSs, PTRSs, and/or SRSs); one or more PUSCHs (e.g., PUSCH occasions/configurations/instances, etc.); one or more PUCCH resources (e.g., PUCCH resource sets/groups); or one or more PRACH occasions/resources/RSs.

The plurality of TCI states may be configured via RRC signaling (e.g., and/or via a MAC-CE signaling, indication or activation) or via other logically equivalent signaling or messages. The WTRU may receive, e.g., via the MAC-CE or a separate signaling, an information including a mapping between one or more codepoints of a DCI field (e.g., TCI field, and/or TCI selection field) and at least one TCI state of the plurality of TCI states. The WTRU may receive DCI including the DCI field. The WTRU may determine or receive an indication/or configuration information indicating one or more TCI states, of the plurality of TCI states, mapped to a codepoint of the one or more codepoints of the DCI field, where each of the one or more TCI states is applicable after a time duration determined based on a beam application time (BAT) parameter.

Figure 4:
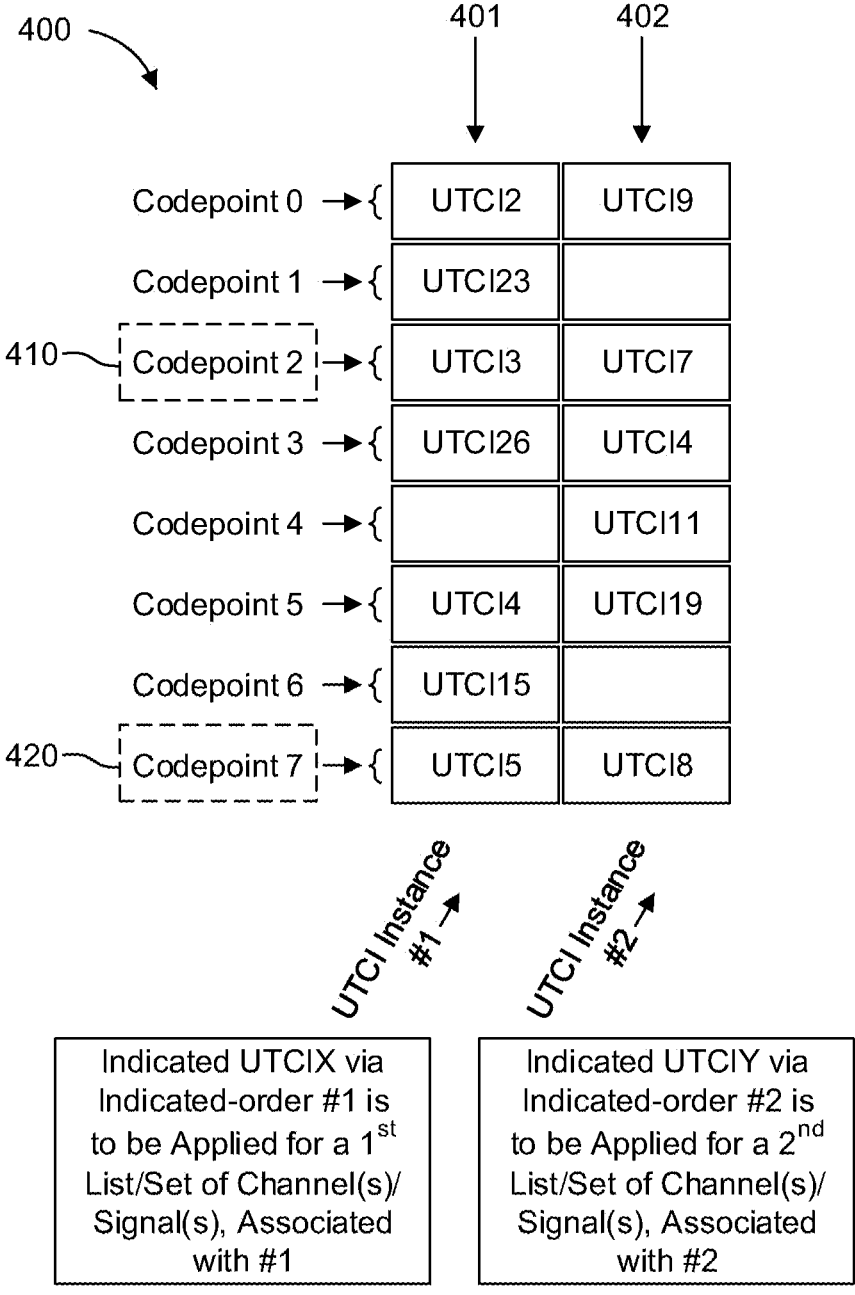
FIG. 4 is a diagram illustrating information as may be included in DCI for indicating a unified TCI (UTCI) state.

FIG. 4 is a diagram illustrating information as may be included in DCI for indicating a unified TCI (UTCI) state. In the example shown in FIG. 4, a mapping between codepoints and one or multiple TCI states as illustrated by the table 400 may be configured at or indicated to a WTRU via a MAC-CE, or other logically equivalent signaling. Each codepoint may be mapped to one or two UTCI states, one of which may be applied subsequently based upon the channel(s) or signal(s) that are configured. In the table 400, the UTCI states present in column 401 correspond to a first UTCI instance (i.e., UTCI instance #1) and may be applicable for a first set of channels or signals. The UTCI states present in column 402 correspond to a second UTCI instance (i.e., UTCI instance #2) and may be applicable for a second set of channels or signals. A WTRU that has been configured with or received an indication of the mapping may be configured to apply a UTCI from one of the UTCI instances upon receiving an indication carried by DCI. For example, the DCI may include a TCI field, which may include, e.g., a 3-bit indicator that corresponds to one of the configured codepoints. Depending upon the channel(s) or signal(s) that are configured or scheduled to be transmitted, the WTRU may apply a UTCI state from UTCI instance #1 or from UTCI instance #2 for the indicated codepoint.

In the specific example shown in FIG. 4, Codepoint 2 is mapped to the set of UTCI states {UTCI3, UTCI7}. Upon receiving DCI including an indication of Codepoint 2 as shown at 410, the WTRU may apply at least one of {UTCI3, UTCI7} to the multiple channel(s)/signal(s), e.g., based on a list of the multiple channel(s)/signal(s) configurable by a higher-layer signaling from a base station. In some examples, the list of the multiple channel(s)/signal(s) may be given per UTCI instance (e.g., TCI-state group, a group of TCI-states, a set of activated TCI-states), where the UTCI instance may correspond to each column of the mapping table, illustrated in the figure, between a codepoint and the one or more TCI states. Further illustrated in FIG. 4, Codepoint 7 is mapped to the set of UTCI states {UTCI5, UTCI8}. Upon receiving DCI including an indication of Codepoint 7 as shown at 420, the WTRU may apply at least one of {UTCI5, UTCI8} to the configured channel(s)/signal(s).

A description of TRP, MTRP, and/or M-TRP-based systems is provided herein. Hereafter, the term TRP (i.e., transmission and reception point) may be interchangeably used with one or more of the terms TP (transmission point), RP (reception point), RRH (radio remote head), DA (distributed antenna), BS (base station), a sector (of a BS), or cell (e.g., a geographical cell area served by a BS), and may remain consistent with the description provided herein. Hereafter, the term Multi-TRP may be interchangeably used with one or more of the terms MTRP, M-TRP, or multiple TRPs, and may remain consistent with the description provided herein.

CSI components are described herein. A WTRU may report a subset of channel state information (CSI) components, where CSI components may correspond to at least a CSI-RS resource indicator (CRI), a SSB resource indicator (SSBRI), an indication of a panel used for reception at the WTRU (such as a panel identity or group identity), measurements such as L1-RSRP, L1-SINR taken from SSB or CSI-RS (e.g. cri-RSRP, cri-SINR, ssb-Index-RSRP, ssb-Index-SINR), and other channel state information such as at least rank indicator (RI), channel quality indicator (CQI), precoding matrix indicator (PMI), Layer Index (LI), and/or the like.

Channel measurements and interference measurements are described herein.

An SSB may be included a transmission upon which a WTRU may perform measurements. A WTRU may receive a synchronization signal/physical broadcast channel (SS/PBCH) block. The SS/PBCH block (SSB) may include a primary synchronization signal (PSS), secondary synchronization signal (SSS), and/or a physical broadcast channel (PBCH) transmission. The WTRU may monitor, receive, or attempt to decode an SSB during initial access, initial synchronization, radio link monitoring (RLM), cell search, cell switching, or other processes or procedures.

A CSI-RS may be included in a transmission upon which a WTRU may perform measurements. A WTRU may measure and report the channel state information (CSI). The CSI (e.g., to be measured or reported) for each connection mode may be based on, may include, or may be configured with one or more of the parameters, information, or characteristics as described in the following paragraphs.

The CSI to be measured or report may be based on a CSI Report Configuration, including one or more of the following: a CSI report quantity, e.g., Channel Quality Indicator (CQI), Rank Indicator (RI), Precoding Matrix Indicator (PMI), CSI-RS Resource Indicator (CRI), Layer Indicator (LI), or other parameters or characteristics; a CSI report type, e.g., aperiodic, semi persistent, and/or periodic report type; a CSI report codebook configuration, e.g., Type I, Type II, Type II port selection, or another configuration; or a CSI report frequency.

CSI to be measured or report may be based on a CSI-RS Resource Set, including one or more of the following CSI Resource settings: one or more NZP-CSI-RS Resources for channel measurement; one or more NZP-CSI-RS Resources for interference measurement; or one or more CSI-IM Resources for interference measurement.

CSI to be measured or report may be based on NZP CSI-RS Resources, including one or more of the following: an NZP CSI-RS Resource ID; a periodicity and/or offset; QCL Info and TCI-state; or a resource mapping, e.g., number of ports, density, CDM type, etc.

A WTRU may indicate, determine, or be configured with one or more reference signals. The WTRU may monitor, receive, and/or measure one or more parameters based on the respective reference signals. For example, one or more of the following parameters as described in paragraphs below may apply. The following parameters should be understood as non-limiting examples of the parameters that may be included in reference signal(s) measurements. One or more of these parameters may be included, and other parameters may additionally or alternatively be included.

One parameter may be an SS-RSRP. An SS reference signal received power (SS-RSRP) may be measured based on the synchronization signals (e.g., demodulation reference signal (DMRS) in PBCH or SSS). The SS-RSRP may be defined as the linear average over the power contribution of the resource elements (RE) that carry the respective synchronization signal. In measuring the RSRP, power scaling for the reference signals may be required. In the case SS-RSRP is used for L1-RSRP, the measurement may be performed based on CSI reference signals in addition to the synchronization signals.

One parameter may be a CSI-RSRP. CSI-RSRP may be measured based on the linear average over the power contribution of the resource elements (RE) that carry the respective CSI-RS. The CSI-RSRP measurement may be configured within measurement resources for the configured CSI-RS occasions.

One parameter may be an SS-SINR. SS signal-to-noise and interference ration (SS-SINR) may be measured based on the synchronization signals (e.g., DMRS in PBCH or SSS). SS-SINR may be defined as the linear average over the power contribution of the resource elements (RE) that carry the respective synchronization signal divided by the linear average of the noise and interference power contribution. In a case where SS-SINR is used for L1-SINR, the noise and interference power measurement may be performed based on resources configured by higher layers.

One parameter may be a CSI-SINR. CSI-SINR may be measured based on the linear average over the power contribution of the resource elements (RE) that carry the respective CSI-RS divided by the linear average of the noise and interference power contribution. In a case where CSI-SINR is used for L1-SINR, the noise and interference power measurement may be performed based on resources configured by higher layers. In some cases, the noise and interference power may be measured based on the resources that carry the respective CSI-RS.

One parameter may be an RSSI. A received signal strength indicator (RSSI) may be measured based on the average of the total power contribution in configured OFDM symbols and bandwidth. The power contribution may be received from different resources (e.g., co-channel serving and non-serving cells, adjacent channel interference, thermal noise, and so forth)

One parameter may be an CLI-RSSI. A cross-link interference received signal strength indicator (CLI-RSSI) may be measured based on the average of the total power contribution in configured OFDM symbols of the configured time and frequency resources. The power contribution may be received from different resources (e.g., cross-link interference, co-channel serving and non-serving cells, adjacent channel interference, thermal noise, and so forth)

One parameter may be an SRS-RSRP. Sounding reference signals RSRP (SRS-RSRP) may be measured based on the linear average over the power contribution of the resource elements (RE) that carry the respective SRS.

Properties of a grant or assignment are described herein. A property of a grant or assignment as referred to herein may include at least one of the following: a frequency allocation; an aspect of time allocation, such as a duration; a priority; a modulation and coding scheme; a transport block size; a number of spatial layers; a number of transport blocks; a TCI state, CRI or SRI; a number of repetitions; an indication whether a repetition scheme is Type A or Type B; an indication whether the grant is a configured grant type 1, type 2 or a dynamic grant; an indication whether the assignment is a dynamic assignment or a semi-persistent scheduling (configured) assignment; a configured grant index or a semi-persistent assignment index; a periodicity of a configured grant or assignment; a channel access priority class (CAPC); or any parameter provided in a DCI, by MAC or by RRC for scheduling the grant or assignment.

In the following description, an indication provided via DCI may include at least one of the following: an explicit indication provided by a DCI field or by RNTI used to mask CRC of the PDCCH; or an implicit indication by a property such as DCI format, DCI size, CORESET or search space, aggregation Level, a first resource element of the received DCI (e.g., an index of a first Control Channel Element). In the latter instance, an implicit mapping between the property and the value, characteristic, or parameter may be signaled by RRC or MAC, or via other logically equivalent signaling.

Hereafter, the term signal may be interchangeably used with one or more of following terms but remain consistent with the description provided herein: sounding reference signal (SRS); channel state information-reference signal (CSI-RS); demodulation reference signal (DM-RS); phase tracking reference signal (PT-RS); or synchronization signal block (SSB).

Hereafter, the term channel may be interchangeably used with one or more of following terms but remain consistent with the description provided herein: physical downlink control channel (PDCCH); physical downlink shared channel (PDSCH); physical uplink control channel (PUCCH); physical uplink shared channel (PUSCH); physical random access channel (PRACH); or another type of channel.

Hereafter, the term downlink reception may be used interchangeably with the terms Rx occasion, PDCCH, PDSCH, or SSB reception, but may remain consistent with the description provided herein.

Hereafter, the term uplink transmission may be used interchangeably with the terms Tx occasion, PUCCH, PUSCH, PRACH, or SRS transmission, but may remain consistent with the description provided herein.

Hereafter, the term RS may be interchangeably used with one or more of the terms RS resource, RS resource set, RS port, or RS port group, but may remain consistent with the description provided herein.

Hereafter, the term RS may be used interchangeably used with one or more of the terms SSB, CSI-RS, SRS or DM-RS, but may remain consistent with description provided herein.

Hereafter, the term time instance may be interchangeably used with the terms slot, symbol, subframe, but may remain consistent with the description provided herein.

Hereafter, the term UTCI may be interchangeably used with the terms TCI, UTCI state, or TCI state, but may remain consistent with the description provided herein.

Hereafter, the terms UL-only and DL-only Tx/Rx occasions may interchangeably be used with the terms legacy TDD UL or legacy TDD DL, respectively, and may remain consistent with the description provided herein. In some examples, legacy TDD UL/DL Tx/Rx occasions may refer to occasions where SBFD is not configured and/or where SBFD is disabled.

Hereinafter, the terms received signal power, received signal energy, received signal strength, SSB EPRE, CSI EPRE, RSRP, RSSI, SINR, RSRQ, SS-RSRP, SS-RSSI, SS-SINR, SS-RSRQ, CSI-RSRP, CSI-RSSI, CSI-SINR, or CSI-RSRQ may be used interchangeably, but may remain consistent with the description provided herein.

Hereafter, the term UL signal (e.g., referring to at least one of SRS, DMRS, PUSCH, PUCCH, PRACH, PTRS, etc.) may be used interchangeably with the terms UL signal or channel, or the terms UL channel or signal, but may remain consistent with the description provided herein.

Hereafter, the term DL signal (e.g., referring to at least one of CSI-RS, SSB, PDSCH, PDCCH, PBCH, PTRS, etc.) may be used interchangeably with the terms DL signal or channel, or the terms DL channel or signal, but may remain consistent with the description provided herein.

Subband non-overlapping full duplex (SBFD) operation is described herein. A WTRU may be configured with one or more types of slots within a bandwidth, wherein a first type of slot may be used or determined for a first direction (e.g., downlink, or sidelink (e.g., WTRU-to-WTRU communication, device-to-device communication)); a second type of slot may be used or determined for a second direction (e.g., uplink, or sidelink); a third type of slot may have a first group of frequency resources within the bandwidth for a first direction and a second group of frequency resources within the bandwidth for a second direction.

In some examples, the bandwidth may be interchangeably used with bandwidth part (BWP), carrier, subband, and system bandwidth. In some examples, the first type of slot (e.g., the slot for a first direction) may be referred to as a downlink (and/or sidelink) slot. in some examples, the second type of slot (e.g., slot for a second direction) may be referred to as an uplink (and/or sidelink) slot. In some examples, the third type of slot may be referred to as Sub-Band (non-overlapping or overlapping) Full Duplex (SBFD) slot, e.g., including at least one of DL SB(s), UL SB(s), sidelink SB(s), guard band(s) (or RB(s)), and flexible SB(s) (e.g., SB(s) that may be dynamically determined as one of DL SB(s), UL SB(s), sidelink SB(s)). In some examples, the group of frequency resource for a first direction may be referred to as downlink (and/or sidelink) subband, downlink (and/or sidelink) frequency resource, or downlink (and/or sidelink) RBs. In some examples, the group of frequency resource for a second direction may be referred to as an uplink (and/or sidelink) subband, uplink (and/or sidelink) frequency resource, or uplink (and/or sidelink) RBs. In some examples, the group of frequency resource for a flexible direction (e.g., that can be configured for a first direction, second direction, etc.) may be referred to as flexible subband, flexible frequency resource, or flexible RBs. In some examples, the group of frequency resource between a first direction and a second direction may be referred to as guard band, guard frequency resource, or guard RBs.

In some examples, a (e.g., SBFD-enabled) WTRU may receive configuration information or be configured with one or more SBFD UL, DL, sidelink, flexible, and/or guard subbands in one or more DL/UL/flexible TDD time instances (e.g., symbols, slots, frames, and so forth). The WTRU may be configured with one or more resource allocations for SBFD subbands.

For example, the SBFD configuration may include a flag signal (e.g., an enabled/disabled flag), where for example a first value (e.g., zero (0) indicates a first mode of operation (e.g., SBFD configuration), and a second value (e.g., one (1)) may indicate a second mode of operation (e.g., non-SBFD operation). The modes of operation (e.g., SBFD and/or non-SBFD) may be indicated via MIB, SIB, RRC, MAC-CE, DCI, or via other logically equivalent signaling or messages.

The WTRU may receive an indication of the time resources (e.g., one or more symbols, slots, and so forth), for which the first mode of operation (e.g., SBFD) is defined in, for example, one or more BWPs, subbands, component carriers (CC), cells, and so forth. The WTRU may receive an indication of the frequency resources (e.g., subbands/BWPs including one or more PRBs) within a (active and/or linked) BWP, for which the first mode of operation (e.g., SBFD) is configured. The time instances (e.g., slots, symbols) may be indicated based on periodic, semi-persistent, or aperiodic type configurations. In some examples, the time instances may be indicated via a bitmap configuration, where each bit corresponds to a time instance (e.g., slot, symbol, subframe, etc.) and each bit indication indicates whether a corresponding time instance can be used for the first or second mode of operation.

In some examples, a WTRU may be configured with a DL TDD configuration for a component carrier (CC) or a BWP for one or more Rx occasions (e.g., via tdd-UL-DL-config-common, dedicated configurations, slot format indicator (SFI), or via other configuration information or indicators). As such, if the first mode of operation (e.g., SBFD) is configured, one or more of the configured frequency resources (e.g., subbands, PRBs, and/or BWPs) may be configured for the transmission in UL channels and/or Tx occasions.

In some examples, the WTRU may be configured with an UL TDD configuration for a component carrier (CC) or a BWP for one or more Tx occasions (e.g., via tdd-UL-DL-config-common, dedicated configurations, slot format indicator (SFI), and so forth). As such, if the first mode of operation (e.g., SBFD) is configured, one or more of the configured frequency resources (e.g., subbands, PRBs, and/or BWPs) may be configured as the DL channels and/or Rx occasions.

In some examples, the WTRU may be configured with a DL, UL, or Flexible TDD configuration for a component carrier (CC) or a BWP for one or more Rx/Tx occasions (e.g., via tdd-UL-DL-config-common, dedicated configurations, slot format indicator (SFI), and so forth). As such, if the first mode of operation (e.g., SBFD) is configured, one or more of the configured frequency resources (e.g., subbands, PRBs, and/or BWPs) may be configured for the first mode of operation (e.g., either UL transmission or DL reception based on the configurations).

The duplexing mode for the first mode of operation (e.g., SBFD configuration (UL/DL)) may be indicated via a flag indication, where for example a first value (e.g., zero (0)) may indicate a first direction (e.g., UL duplexing mode), and a second value (e.g., one (1)) may indicate a second direction (e.g., DL duplexing model). The duplexing mode configuration and/or flag for the first mode of operation (e.g., SBFD) may be configured as part of a mode of operation configuration, provided for example via MIB, SIB, RRC, DCI, MAC-CE, or via other logically equivalent signaling. The duplexing mode configuration and/or flag for the first mode of operation (e.g., SBFD) may be configured as part of a resource allocation configuration for a Tx/Rx occasion.

In some examples, a WTRU may be configured with one or more types of slots. The WTRU may be configured with a first slot with a first type, where the first type may be, for example, an SBFD slot. The WTRU may be configured with a second slot with a second type, where the second type may be for example non-SBFD slot. As for the first slot with the first type (SBFD), the WTRU may be configured with one or more DL, UL, flexible, guard, etc. subbands in the frequency domain, throughout the BWP, for the duration of the first slot. However, in the second slot with the second type (non-SBFD), the WTRU may be configured with only one direction type, for example DL, UL, flexible, etc., in the frequency domain, throughout the BWP, for the duration of the second slot.

In some examples, if the WTRU is configured with a second slot with UL direction, this may imply the use of a legacy TDD UL slot, UL-only slot, and/or non-SBFD UL slot. In another example, if the WTRU is configured with a third slot with second type (non-SBFD) with DL direction, this may imply the use of a legacy TDD DL slot, DL-only slot, and/or non-SBFD DL slot. In another example, if the WTRU is configured with a fourth slot with second type (non-SBFD) with flexible direction, this may imply the use of a legacy TDD flexible slot and/or non-SBFD flexible slot, and so forth.

SBFD time-domain configurations are described herein. A WTRU may receive configuration information for (e.g., may be configured with) SBFD subband time locations that may be configured within a period. In some examples, the period may be the same as a TDD-UL-DL pattern period configured by dl-UL-TransmissionPeriodicity, e.g., in TDD-UL-DL-ConfigCommon. In an (e.g., another) example, the period may be an integer multiple of a TDD-UL-DL pattern period configured by dl-UL-TransmissionPeriodicity, e.g., in TDD-UL-DL-ConfigCommon.

In some examples, when a (e.g., one, only one) TDD-UL-DL pattern is configured, SBFD symbols may be configured in a consecutive manner within a TDD-UL-DL pattern period. In some examples, when two TDD-UL-DL patterns are configured and if SBFD symbols are configured for only one of the patterns, SBFD symbols may be configured in a consecutive manner within the TDD-UL-DL pattern period. In some examples, when two TDD-UL-DL patterns are configured and if SBFD symbols are configured for both patterns, SBFD symbols may be configured in consecutive manner within each TDD-UL-DL pattern period.

Usable PRBs are described herein. A WTRU may determine (or receive an indication/or configuration information indicating) that 'UL usable PRBs' are a part of UL subband frequency resources within an UL BWP (e.g., an active UL BWP, a currently active UL BWP), and 'DL usable PRBs' are a part of DL subband frequency resources within an DL BWP (e.g., an active DL BWP, a currently active DL BWP). The UL usable PRBs may be determined as an intersection between a configured or indicated UL subband and an active UL BWP in SBFD symbols (and/or slots). The DL usable PRBs may be determined as an intersection between a configured or indicated DL subband(s) and an active DL BWP in SBFD symbols (and/or slots). In an (e.g., another) example, the UL and/or DL usable PRBs may be explicitly configured within active UL and/or DL BWP, e.g., in SBFD symbols and/or slots.

In some examples, a WTRU may receive information associated with a frequency resource allocation (e.g., Type 0 as an RBG-level bitmap-based resource assignment) for a PDSCH or PUSCH (as is being scheduled) in one or more slot(s). When an assigned RBG overlaps with a subband boundary, the WTRU may determine that the PRBs within DL usable PRBs (e.g., only these PRBs) are valid for PDSCH reception and the PRBs within UL usable PRBs (e.g., only these PRBs) are to be valid for PUSCH transmission. This may imply that "partial RBG" operation is allowed and valid for resource allocation.

Solutions utilizing separate QCL or TCI-states for SBFD symbol types and non-SBFD symbol types are described herein. In an SBFD system, across SBFD symbols and non-SBFD symbols, it may be necessary to determine whether separate QCL and/or TCI-state configurations are applied or not, in consideration of different interference nature on different symbol types, e.g., due to non-negligible self-interference when using a DL beam on SBFD symbols.

Figure 5:
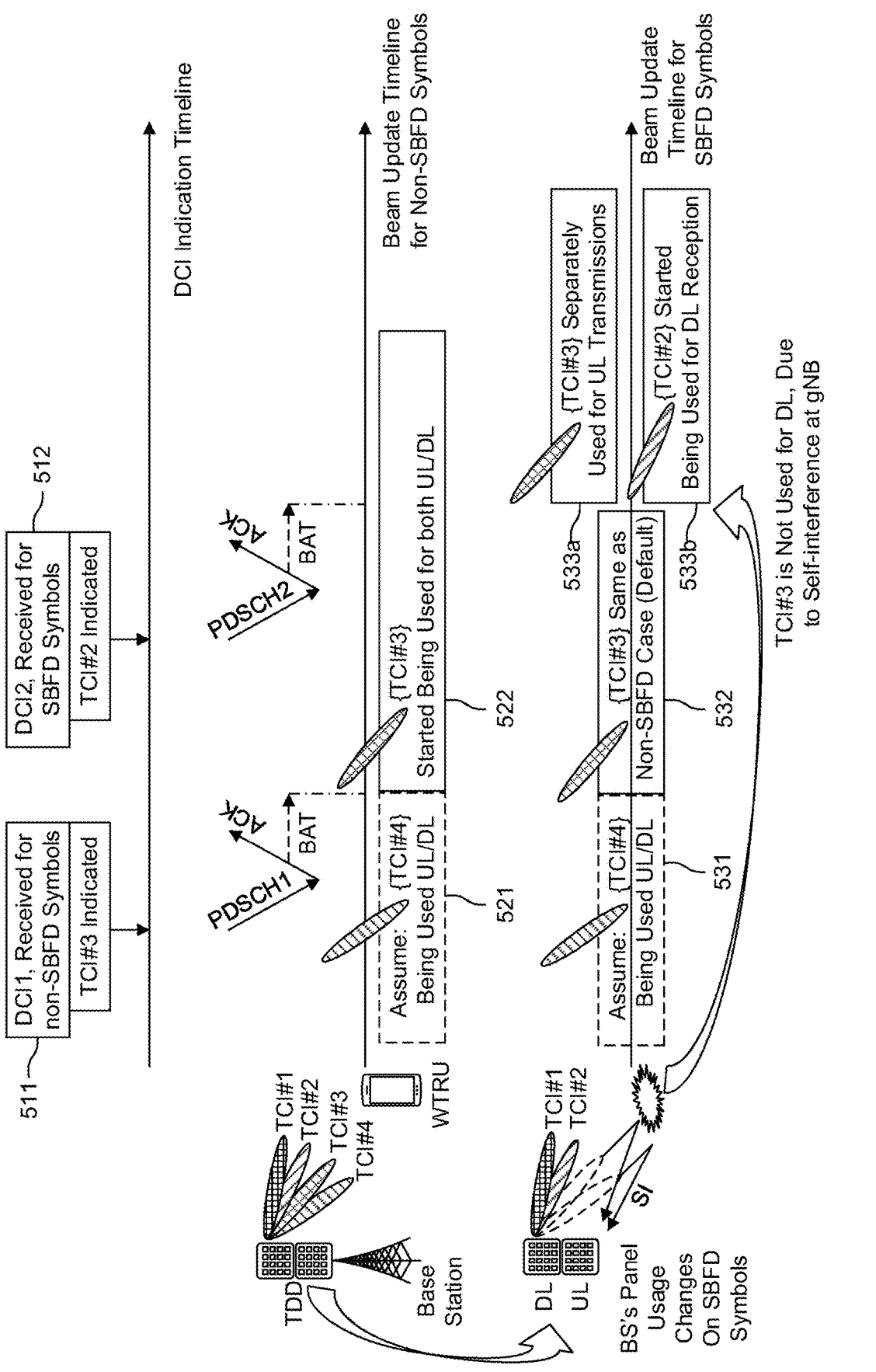
FIG. 5 is diagram illustrating an example procedure for implementing separated beam/TCI control across different SBFD symbol types in a single TRP scenario and under a unified TCI (UTCI) framework.

FIG. 5 is diagram illustrating an example procedure for implementing separated beam/TCI control across different SBFD symbol types in a single TRP scenario and under a unified TCI (UTCI) framework. In some scenarios, such as the scenario depicted in FIG. 5, a WTRU may receive configuration information indicating a plurality of TCI-states. The WTRU may receive a TCI-activation command (e.g., via a MAC-CE, or via another logically equivalent message) indicating (e.g., activating, updating, etc.) an activated set of TCI-states (e.g., TCI #1, TCI #2, TCI #3, TCI

4, as shown in FIG. 5) among the plurality of TCI-states. In some examples, the WTRU may maintain (e.g., track, keep tracking) one or more quasi co-location (QCL) properties based on RSs within the activated set of TCI-states. The one or more QCL properties may include at least one of the parameters {average delay, Doppler shift, delay spread, Doppler spread, spatial Rx, and/or average power}. The WTRU may track or maintain such QCL properties, for example, upon receiving the TCI-activation command. In some examples, the WTRU may not maintain (e.g., track) the QCL properties for an RS of a TCI-state (among the plurality of TCI-states) that are not activated by the TCI-activation command. The activated set of TCI-states may be ready for use for a transmission or a reception when scheduled.

In the example illustrated in FIG. 5, as shown at 511, the WTRU may receive a first DCI (DCI1) scheduling a first PDSCH transmission (PDSCH1) and indicating a first TCI-state (e.g., TCI #3) among the activated set of TCI-states. In some examples not shown, the first DCI may indicate a first TCI-state without scheduling a PDSCH transmission. The WTRU may have previously received an indication of a TCI state different from the indicated TCI #3 (not illustrated in FIG. 5). The WTRU may receive (e.g., decode, demodulate) the first PDSCH according to the previously-received TCI state indication, TCI #X (e.g., where X=4). In response to receiving the first PDSCH transmission (using the previously-received TCI state indication of TCI #4), the WTRU may transmit an ACK (to a base station, or a nodeB (e.g., a gNB)) indicating the successful reception of the first PDSCH transmission and/or a successful reception of the indicated first TCI-state (TCI #3). The WTRU may start or be configured to start to apply the indicated first TCI-state (TCI #3) at a beam application time, T_BAT, subsequent to transmitting the ACK. The value of the beam application time, e.g., T_BAT, may be configured by the base station or determined by the WTRU. Until further receiving a second indicated TCI-state (e.g., by DCI2), shown at 512 and described in further detail below, the WTRU may maintain (e.g., in terms of the QCL properties) the indicated first TCI-state (TCI #3) for use in communication with the base station (i.e., transmitting UL transmissions and/or receiving DL transmission) base station.

The WTRU may determine that the reception of DCI1 or the first TCI state (TCI #3) is associated with non-SBFD symbols, e.g., in terms of TCI/beam update. The determination may be based on an explicit indication from a base station and/or based on an implicit rule (e.g., based on the symbol(s) where the DCI1 is received, which CORESET (and/or search space) the DCI1 is received, which RNTI the detected DCI1 is scrambled with, or based on other conditions). As shown at 522, based upon a determination that the reception of DCI1 or the first TCI state (TCI #3) is associated with non-SBFD symbols, the WTRU may update the indicated first TCI state (TCI #3) for UL transmissions and/or DL receptions, e.g., at least for non-SBFD symbols, or for both non-SBFD symbols and SBFD symbols until a SBFD-specific TCI control command is received. In some examples (e.g., by default, as shown in FIG. 5 at 532), until or unless a SBFD-specific TCI control command is received, the WTRU may use the first TCI state (TCI #3) also in association with SBFD symbols, e.g., for UL transmissions and/or DL receptions. In some examples, the WTRU may transmit a first UL channel or signal (e.g., PUSCH, PUCCH, SRS) using the first TCI state (TCI #3), and/or receive a first DL channel or signal (e.g., PDSCH, PDCCH, CSI-RS) using the first TCI state (TCI #3).

As shown in FIG. 5 at 512, the WTRU may receive a second DCI (DCI2) scheduling a second PDSCH transmission (PDSCH2) and indicating a second TCI-state (e.g., TCI #2) among the activated set of TCI states. In some examples not illustrated in FIG. 5, the WTRU the second DCI may indicate the second TCI-state without scheduling a PDSCH transmission. The WTRU may receive (e.g., decode, demodulate) the second PDSCH transmission using a previously indicated TCI-state (which is TCI #3 indicated by the DCI1). In response to receiving the second PDSCH transmission (using TCI #3), the WTRU may transmit an ACK (e.g., to a base station) indicating successful reception of the second PDSCH transmission and/or a successful reception of the indication of the second TCI state (TCI #2). The WTRU may (be configured to) start to apply the indicated second TCI-state (TCI #2) for at least one communication direction (e.g., DL), e.g., after a beam application time (T_BAT2) subsequent to transmitting the ACK, where the beam application time of T_BAT2 may be configured by the base station and may be same as or independent from the first beam application time (i.e., T_BAT).

The WTRU may determine that the reception of DCI2 or the indication of the second TCI state (TCI #2) is associated with SBFD operation or uses SBFD symbols, e.g., in terms of TCI/beam update. The reception of the DCI2 may correspond to the SBFD-specific TCI control command. The determination may be based on an explicit indication from a base station and/or based on an implicit rule, e.g., on condition of the symbol(s) where the DCI2 is received, which CORESET (and/or search space) the DCI2 is received on, which RNTI the detected DCI2 is scrambled with, and so forth. Based on determining that the reception of DCI2 or the second TCI state (TCI #2) is associated with SBFD symbols, the WTRU may update the indicated second TCI state (TCI #2) for one communication direction (e.g., either UL transmission, or DL reception), where the one communication direction the WTRU applies for may be (pre-) configured or (separately) indicated by the base station. In some examples, as show in FIG. 5 at 533b, based on determining that the reception of DCI2 or the second TCI state (TCI #2) is associated with SBFD symbols, the WTRU may update the indicated second TCI state (TCI #2) for DL reception (e.g., when the one communication direction is configured or indicated as a DL direction). The WTRU may continue to use the first TCI state (TCI #3) in association with SBFD symbols for UL transmissions, as shown at 533a. The WTRU may have updated the indicated second TCI state for DL reception, for example, due to self interference with UL transmissions being carried out using TCI #3. As is also shown in FIG. 5 at 522, in some examples, the WTRU may continue to use the first TCI state (TCI #3) in association with non-SBFD symbols, e.g., for UL transmissions and/or DL reception. In other words, the WTRU may determine no update to the TCI state is necessary for UL or DL transmission on non-SBFD symbols.

In an (e.g., another) example, based on determining that the reception of DCI2 or the second TCI state (TCI #2) is associated with SBFD symbols, the WTRU may update the indicated second TCI state (TCI #2) for (e.g., both) UL transmissions and/or DL receptions which the WTRU performs on SBFD symbol(s), while the WTRU may continue to use the first TCI state (TCI #3) in association with non-SBFD symbols, e.g., for UL transmissions and/or DL receptions.

Based on receiving the SBFD-specific TCI control command (e.g., the DCI2), the WTRU may transmit a second UL channel or signal using the first TCI state (TCI #3) on SBFD symbol(s) and/or non-SBFD symbol(s). The WTRU may receive a second DL channel or signal using the second TCI state (TCI #2) on SBFD symbol(s), while the WTRU may receive a third DL channel or signal by using the first TCI state (TCI #3) on non-SBFD symbol(s). This may provide benefits in terms of improving reliability in one communication direction performance (e.g., UL performance) while maintaining an optimized performance for another (e.g., the other) communication direction, e.g., when the base station transmits a DL signal from a first base station panel and simultaneously receives a UL signal at a second base station panel, and some of DL beams (TCIs) (e.g., TCI #3, TCI #4) cause a self-interference (SI) on the UL reception, e.g., due to signal reflection, diffraction, by a clutter, obstacle, or by a non-ideal spatial-separation between the first and second base station panels, etc.

Configuration aspects relating to FD operation are described herein. A WTRU may receive configuration information (e.g., from a base station, a gNB, a node, or a device) for FD operation conducted by at least one device in a network. In some examples, the FD operation may be conducted by a base station (e.g., a node, a TRP, a cell). The WTRU may operate in a half-duplex (HD) mode for communicating with the base station, where the HD mode may imply at a given time the WTRU either performs a UL transmission or a DL reception (e.g., not both simultaneously at the given time). The WTRU may also, or alternatively, operate in an FD mode for communicating with the base station, e.g., if a corresponding WTRU capability signal(s) is reported to the base station and/or if the WTRU receives a confirmation signal (e.g., enabling the FD, configuring the FD mode) in response to transmitting the WTRU capability signal(s).

FD operation may imply at a given time that a transmitter (e.g., the base station and/or the WTRU) may simultaneously transmit a first signal and receive a second signal. The FD operation may involve subband overlapping FD (e.g., in-band FD (IBFD) operation, in which a first frequency-domain resource (e.g., RBG(s), RB(s), RE(s) allocated for the first signal may have a full (or at least a partial) overlap with a second frequency-domain resource allocated for the second signal. The FD operation may include a subband non-overlapping FD (SBFD) operation, in which a first frequency-domain resource allocated for the first signal (e.g., assigned within a configured SBFD subband, e.g., DL subband, usable DL PRBs) does not have an overlap with a second frequency-domain resource allocated for the second signal (e.g., assigned within a configured SBFD subband, e.g., UL subband, usable UL PRBs).

Herein, for brevity of discussion, it may be assumed that FD operation includes SBFD operation, however the solutions and examples in the disclosure may equally (or equivalently or extendedly, etc.) be employed or be applicable for cases with other FD operation types (e.g., IBFD, etc.). The WTRU may receive configuration information or an indication of multiple FD operation types (e.g., multiple FD symbol types), where a first, second, third (or more) FD operation types (e.g., symbol types) may respectively indicate or correspond to a non-SBFD operation (or symbol) type, an SBFD operation (or symbol) type, an IBFD operation (or symbol) type, and so forth, based on the configuration information or indication. The configuration information or indication may be received from a BS, base station, cell, TRP, and/or another device.

A WTRU may receive SBFD-related configuration information, e.g., for frequency-domain locations of one or more subbands (e.g., DL subbands, UL subbands, flexible DL/UL subbands, and/or guardbands), and/or for time-domain location information of the one or more subbands. The time-domain location information may indicate a set of non-SBFD symbols and a set of SBFD symbols (e.g., as illustrated and described above with respect to FIG. 2). Symbols within the set of non-SBFD symbols may have a symbol type of 'DL symbol', 'UL symbol' or 'flexible symbol'. The WTRU may receive a DL signal on symbol(s) having a symbol type of 'DL symbol' in the set of non-SBFD symbols. The WTRU may transmit a UL signal on symbol(s) having a symbol type of 'UL symbol' in the set of non-SBFD symbols. The WTRU may either receive a DL signal or transmit a UL signal on symbol(s) having a symbol type of 'flexible symbol' in the set of non-SBFD symbols, e.g., depending on one or more conditions with other signal(s) co-existing in the symbol(s).

Solutions for selective TCI-state application based on a determined duplex symbol type and a configured UL channel type including SRS-usage parameter are described herein. In some solutions, a WTRU may carry out one or more steps described as follows. A WTRU may receive configuration of one or more SRS resource sets each including one or more SRS resources, and a plurality of TCI-states. Each TCI-state of the plurality of TCI-states may be associated with a set of power control (PC) parameters (e.g., at least one of {P0, P_offset, alpha, a pathloss (PL)-RS, a closed-loop-index}. An SRS resource set may be associated with a usage parameter indicating at least one of {codebook-based (CB) UL, non-codebook-based (NCB) UL, 'beam management (BM)', 'antenna switching (AS)'}.

The WTRU may receive an indication (e.g., by MAC-CE, or via another logically equivalent signal) of one or more TCI codepoints. A first TCI codepoint of the one or more TCI codepoints may be associated with a first TCI-state and a second TCI-state, which are part of the configured plurality of TCI-states.

The WTRU may receive a second indication (or determine) that the first TCI-state is associated with a first duplex type (e.g., non-SBFD symbol type), and the second TCI-state is associated with a second duplex type (e.g., an SBFD symbol type). The WTRU may receive a third indication (or determine) that an SRS resource set is configured to be applied by an indicated TCI codepoint of the one or more TCI codepoints and/or based on the second indication. The WTRU may receive a control command (e.g., by a DCI, or by other logically equivalent signaling) indicating the first TCI codepoint.

The WTRU may determine that a first SRS resource set is associated with at least one of CB or NCB-based operation and whether a transmission occasion of an SRS resource (of the first SRS resource set) is based on the first duplex type (e.g., on non-SBFD symbols) or the second duplex type (e.g., on SBFD symbols).

If the transmission occasion is on or uses non-SBFD symbols, the WTRU transmits an SRS of the SRS resource using the first TCI-state and using a determined transmission power based on a set of PC parameters associated with the first TCI-state. If the transmission occasion is on or uses SBFD symbols, the WTRU transmits an SRS of the SRS resource using the second TCI-state and using a determined transmission power based on a set of PC parameters associated with the second TCI-state.

In some examples, the WTRU determines a second SRS resource set is associated with at least one of BM or AS-based methods. Based on the determination, the WTRU transmits an SRS in a transmission occasion of the second SRS resource set using the first TCI-state and a determined transmission power based on a set of PC parameters associated with the first TCI-state, regardless whether the transmission occasion of the SRS is on or uses non-SBFD or SBFD symbols (e.g., regardless of symbol type).

In some examples, the WTRU transmits a PRACH using the first TCI-state and a determined transmission power based on a set of PC parameters associated with the first TCI-state, e.g., regardless whether the transmission occasion of the PRACH is on or uses non-SBFD or SBFD symbols (e.g., regardless of symbol type).

Configurations relating to TCI-states and power control parameters are described herein. A WTRU may receive configuration information indicating one or more SRS resource sets, each SRS resource set including one or more SRS resources, and a plurality of TCI-states. Each TCI-state of the plurality of TCI-states may be associated with a set of power control (PC) parameters (e.g., at least one of the parameters {P0, P_offset, alpha, a pathloss (PL)-RS, a closed-loop (CL)-index}). In some examples, the WTRU may determine a UL transmit power level (P), e.g., at a given time i, by the equation $P(i)=P0+P\_offset (i)+alpha*PL(i)$ (estimated by the PL-RS)+a value of a transmit PC (TPC) accumulator (or an absolute TPC value) associated with the CL-index.

An SRS resource set may be associated with a 'usage' parameter indicating at least one of the parameters {codebook-based (CB) UL, non-codebook-based (NCB) UL, 'beam management (BM)', 'antenna switching (AS)'}, as illustrated in FIG. 6, introduced and further described in paragraphs below. In some examples, when the usage parameter in a configured SRS resource set is set to BM, the WTRU may apply Tx beam sweeping when transmitting SRSs across multiple SRS resources configured in the SRS resource set, e.g., applying a same Tx power level determined by PC parameter(s) (commonly) configured in the SRS resource set.

In some examples, when the usage parameter in a configured SRS resource set indicates either a CB or NCB-based scheme, the WTRU may determine a transmitted SRS resource which may be used for subsequent (scheduled) PUSCH transmissions, e.g., where the determination of the transmitted SRS resource may be based on an SRS resource indicator (SRI) indicated by a DCI (UL grant). In some examples, when a CB-based UL transmission scheme is enabled, the DCI (UL grant) may further include a transmit precoding matrix indicator (TPMI). A matrix ($S_{port}$ by $R_{layer}$), e.g., indicated by a TPMI field in the DCI, may be applied on the WTRU's $S_{port}$ Tx antenna ports that were used for the SRS transmission based on the SRS resource indicated by the SRI (in the DCI). Applying the indicated TPMI on the $S_{port}$ Tx antenna ports of the SRS resource indicated by the SRI may imply that the WTRU may (e.g., may be configured to, or should) use the same antenna virtualization coefficients (e.g., analogue beamforming coefficients, phase shifting coefficients, etc.), applied when transmitting the $S_{port}$ SRS resource, to determine precoding coefficients for the scheduled PUSCH transmission. The precoding coefficients may be determined based on the indicated TPMI ($S_{port}$ by $R_{layer}$) applied on top of the transmitted $S_{port}$ SRS resource indicated by the SRI.

In some examples, when an NCB-based UL transmission scheme is enabled, the DCI (UL grant) may further indicate a combination of SRIs, which may be used for determining precoding coefficients for the scheduled PUSCH transmission (without the extra TPMI signaling). In such event, each indicated SRI (e.g., 1-port SRS resource) may represent 1-layer precoding coefficient(s), e.g., which may imply that the total number of indicated SRIs based on the indicated combination of SRIs is equal to the total number of layers scheduled for the PUSCH transmission. In some examples, when the usage parameter in a configured SRS resource set is set to AS, the WTRU may determine based on a specifically configured rule or procedure that an SRS transmission of each SRS resource (or each SRS resource set) (for AS) may be performed using antenna switching at the WTRU. For example, the SRS transmissions may be performed across different WTRU Rx chains (e.g., reception antennas, RX antenna branches, etc.) by using smaller (or equal) number of Tx antenna chains (e.g., Tx antennas), e.g., to aid the BS's DL channel acquisition based on channel reciprocity.

FIG. 6 is a diagram illustrating an example of SRS resource set configuration information, as may be carried in an RRC information element, such as SRS-Config. It should be understood that information illustrated in FIG. 6 may be carried, in other examples, through other messages or means such as DCI, MAC-CE, or other logically equivalent signaling, or may be preconfigured at the WTRU. The SRS resource set configuration may define a list of SRS-ResourceSets, and each resource set may define a set of SRS-Resources or SRS-PosResources. The SRS resource set configuration may be transmitted from the network to the WTRU. The transmission of a set of SRS-Resources or SRS-PosResources by the WTRU may be triggered or indicated by the network, such as via DCI or other logically equivalent signaling. The SRS resource set configuration information may include, for example, an identifier (ID) for each resource set, which may be unique in the context of a BWP for which the SRS-Config is defined. For each resource set, a list of SRS resources may be provided by the field SRS-ResourceIdList. Resources in each resource set may have a resource type that specifies the time domain behavior of the resource, such as periodic, aperiodic, or semi-persistent SRS. An identifier of a CSI-RS resource may be included in the SRS resource set configuration information, indicating a CSI-RS resource that is associated with the SRS resource set. Other fields, such as the usage, applyIndicatedTCI-State and followUnifiedTCI-StateSRS fields may function substantially as described in preceding and subsequent paragraphs.

TCI-activation commands associating a TCI-state and a FD symbol type are described herein. In some examples, the WTRU may receive a first indication (e.g., via a MAC-CE, a TCI-activation MAC-CE, a separate MAC-CE, or via other logically equivalent signaling) of one or more TCI codepoints, where a first TCI codepoint of the one or more TCI codepoints may be associated with a first TCI-state and a second TCI-state which are of (among) a plurality of TCI-states that are configured or preconfigured (e.g., by RRC) at the WTRU. The WTRU may receive a second indication (or determine) that the first TCI-state is associated with a first duplex type (e.g., non-SBFD symbol type), and the second TCI-state is associated with a second duplex type (e.g., SBFD symbol type). In some examples, the first indication and the second indication may be combined in one signaling message (e.g., format, container) that is delivered to the WTRU.

The WTRU may (e.g., may be configured to) determine an ordered position (e.g., within the unified TCI state instance, TCI-state group, a group of TCI-states, a set of activated TCI-states) of either the first or second TCI-state based on the first TCI codepoint that may indicate more than one TCI-state (e.g., an ordered set of TCI-states, e.g., the first and second TCI-states). For example, the WTRU may determine that the first TCI-state corresponds to, belongs to, is mapped to, or is associated with a first ordered position. The WTRU may determine that the second TCI-state corresponds to, belongs to, is mapped to, or is associated with a second ordered position. In some examples, the WTRU may determine to use (e.g., at least for determining spatial-domain parameters/coefficients and/or for determining a Tx power level based on an indicated TCI-state) the first TCI-state for transmitting an SRS based on an SRS resource (or resource set) associated with an indicator or parameter (e.g., 'applyIndicatedTCI-State' as illustrated in examples shown in FIG. 6 and/or FIG. 4) indicating a value (e.g., 'first'). In some examples, the WTRU may determine to use the second TCI-state for transmitting a second SRS based on a second SRS resource (or resource set) associated with an indicator or parameter (e.g., 'applyIndicatedTCI-State' as illustrated in examples shown in FIG. 6 and/or FIG. 4) indicating a value (e.g., 'second'). The indicator or parameter (e.g., 'applyIndicatedTCI-State') may be configured or indicated for a (e.g., each) physical channel or signal (and/or each particular type of a physical channel or signal).

Examples of "symbol-type-specific" TCI-state selection on SRS transmission behaviors based on a particular 'usage' parameter value are described herein. A WTRU may receive a third indication (or determine) that an SRS resource set is configured to be applied by an indicated TCI codepoint of the one or more TCI codepoints and/or based on the second indication. The WTRU may receive a control command (e.g., by a DCI) indicating the first TCI codepoint.

In some solutions, the WTRU may determine that a first SRS resource set is associated with at least one of a CB or NCB-scheme and whether a transmission occasion of an SRS resource (e.g., of the first SRS resource set) uses the first duplex type (e.g., is on or uses non-SBFD symbols) or the second duplex type (e.g., is on or uses SBFD symbols). If the transmission occasion is on or uses non-SBFD symbols, the WTRU may transmit an SRS of the SRS resource using the first TCI-state and using a determined transmission power based on a set of PC parameters associated with the first TCI-state. If the transmission occasion is on or uses SBFD symbols, the WTRU may transmit an SRS using the second TCI-state and using a determined transmission power based on a set of PC parameters associated with the second TCI-state.

The WTRU may also determine that a first SRS resource set is associated with at least one of a CB or NCB-based scheme and whether a transmission occasion of an SRS resource (of the first SRS resource set) is based on a first configuration of a duplex type (e.g., on a first SBFD configuration of an SBFD symbols) or the second configuration of a duplex type (e.g., on a second SBFD configuration of an SBFD symbols). For example, the WTRU may be configured with multiple SBFD configurations, e.g., with different UL subband configurations within the DL subband (frequency band width and/or position), where each of the multiple SBFD configurations, e.g., for "dynamic SBFD operation", if enabled by the BS or the network, may be (e.g., dynamically) determined based on one or more (pre-configured) conditions. The one or more conditions may be based on at least one parameter indication, update, or change by a neighbor base station (e.g., TRP, cell), e.g., a neighbor cell's SBFD configuration change at least in terms of SBFD subband location parameter change which may be received by the WTRU via receiving a broadcast signal transmitted from the neighbor base station (e.g., TRP, cell), and/or transmitted from a serving-cell of the WTRU.

The one or more conditions may be based on at least one parameter indication, update, or change associated with a carrier (e.g., a component carrier (CC), cell, TDD carrier, etc. in the frequency domain). The one or more conditions may be based on a different CC's SBFD configuration change, which may be indicated at least in terms of an SBFD subband location parameter change. The SBFD subband location parameter change may be, for example, received by the WTRU via receiving a broadcast signal transmitted from the serving-base station (e.g., TRP, cell), from the CC for which the SBFD configuration change occurs, and/or from a serving-cell (e.g., CC) for which the first SRS resource set is configured.

The one or more conditions may be based on other explicit parameter(s) configured or indicated, e.g., in relation to FD parameter(s).

If the transmission occasion is associated with a first SBFD configuration for SBFD symbols, the WTRU may transmit an SRS from the first SRS resource set using the first TCI-state and using a determined transmission power based on a set of PC parameters associated with the first TCI-state. If the transmission occasion is associated with a second configuration for SBFD symbols, the WTRU may transmit an SRS from the first SRS resource set using the second TCI-state and using a determined transmission power based on a set of PC parameters associated with the second TCI-state.

The WTRU may determine a second SRS resource set is associated with at least one of BM or AS-based methods or schemes. Based on the determination, the WTRU may transmit an SRS from the second SRS resource set using the first TCI-state and a determined transmission power based on a set of PC parameters associated with the first TCI-state, whether the transmission occasion of the SRS is on either non-SBFD or SBFD symbols (e.g., regardless of symbol type). This may provide benefits in terms of improved flexibility, efficiency, and/or robustness on SRS transmissions, in that the WTRU behavior may depend on the "usage" of the SRS. For example, if the SRS is to be transmitted under a CB or NCB-based scheme, a TCI-state to be applied may follow the unified TCI associated with an overlapping symbol type, whereas if the SRS is to be transmitted under a BM or AS-based scheme, then the TCI-state to be applied may be independent from the unified TCI, e.g., may use indicated TCI-state(s). In some solutions, the WTRU may receive configuration information or an indication that may (e.g., explicitly) enable (or disable) the application of a TCI-state based on a "tie-in (e.g., association, linkage, mapping) with a UL channel or signal, e.g., SRS, or SRS with particular usage(s)." The configuration information or indication may be provided via an enabling or disabling parameter, such as "followUTCIfromFDSymbolType", "followTCIfromSBFDSymbolType", and/or the like, which may be configurable via a TCI-state related configuration.

In some examples, the WTRU may receive a configuration or indication which may (e.g., explicitly) enable (or disable) the application of a "tie-in (e.g., association, linkage, mapping) with a TCI-state (e.g., an ordered TCI-state of a TCI codepoint)" for a UL channel or signal, e.g., SRS, or SRS with particular usage(s). The configuration information or indication may be provided via an enabling or disabling parameter, such as "followUTCIfromFDSymbolType", "followTCIfromSBFDSymbolType", and/or the like, which may be configurable via the UL channel or signal related configuration.

Mechanisms for applying a selective TCI-state based on a determined FD symbol type and a configured physical channel or signal type are described herein. The WTRU may receive an indication or configuration information indicating (or may determine) that, for a physical channel or signal (or one or particular types of a physical channel or signal), "symbol-type-specific" TCI-state selection (e.g., among an ordered set of TCI-states indicated by a TCI-codepoint) may be applied, or not applied, for receiving or transmitting the physical channel or signal, e.g., based on a time occasion of the Rx or Tx of the physical channel or signal (or one or particular types of a physical channel or signal).

In some examples, the applicable physical channel or signal (or one or particular types of a physical channel or signal) may be at least one of the following. The applicable physical channel or signal may be a PUSCH (e.g., all types of PUSCH, or one or more particular types of PUSCH), such as a configured grant (CG)-PUSCH (or further specific to a particular Tx type, e.g., a Type-1 CG-PUSCH, a Type-2 CG-PUSCH, etc.) or a dynamic grant (DG) PUSCH. The applicable physical channel or signal may be a PUCCH (e.g., all types of PUCCH, or one or more particular types of PUCCH), such as a PUCCH carrying CSI reporting contents (e.g., a PUCCH carrying a UCI), and/or a PUCCH carrying a HARQ-ACK (or HARQ-NACK) feedback. The applicable physical channel or signal may be an SRS (e.g., all types of SRS, or one or more particular types of SRS), such as an SRS resource, an SRS resource set, an SRS configuration (e.g., 'SRS-config') that may include one or more SRS resource sets (or, one or more SRS resources), or a group of SRS resources associated with a (e.g., same) 'usage' parameter, e.g., indicating at least one of {CB, NCB, BM, AS}. The applicable physical channel or signal may be a PRACH (e.g., all types of PRACH, or one or more particular types of PRACH), such as a group of PRACHs, associated with (e.g., used for) a contention-based random access (or a contention-free random access), a group of PRACHs, associated with (e.g., used for) a 4-step RACH procedure (or a 2-step RACH procedure). The applicable physical channel or signal may be a PDSCH (e.g., all types of PUSCH, or one or more particular types of PUSCH), such as a semi-persistent-scheduling (SPS)-PDSCH (or further specific to a particular type of SPS-PDSCH, if configured), or a dynamic grant (DG) PDSCH. The applicable physical channel or signal may be a PDCCH (and/or CORESET) (e.g., all types of PDCCH (and/or CORESET), or one or more particular types of PDCCH (and/or CORESET)), such as a group of PDCCH types, a group of cell-common PDCCHs (e.g., that may be associated with a cell-specific search space (set)), a group of WTRU-specific PDCCHs (e.g., that may be associated with a WTRU-specific search space (set), a PDCCH associated with a particular group of search spaces (or search space sets), a PDCCH associated with a particular group of CORESETs (e.g., a special CORESET, CORESET #0, CORESET #0 that may be used for initial access, a CORESET that is configured as a part of beam failure recovery procedure). The applicable physical channel or signal may be an CSI-RS (e.g., all types of CSI-RS, or one or more particular types of CSI-RS), such as a CSI-RS resource, a CSI-RS resource set, a CSI-RS configuration (e.g., 'CSI-RS-config') that may include one or more CSI-RS resource sets (or, one or more CSI-RS resources), a group of CSI-RS resources associated with a (e.g., same) particular usage, e.g., applicable for beam management, mobility management, and/or RRM, etc., or a group of CSI-RS resources for tracking (e.g., tracking RS (TRS)). The applicable physical channel or signal may be a demodulation RS (DMRS) (e.g., all types of DMRS, or one or more particular types of DMRS). The applicable physical channel or signal may be a phase-tracking RS (PTRS) (e.g., all types of PTRS, or one or more particular types of PTRS).

If a physical channel or signal (or one or particular types of a physical channel or signal) is applied (e.g., should be applied, shall be applied) by the "symbol-type-specific" TCI-state selection, the WTRU may determine a transmission or reception occasion of the physical channel or signal and whether the occasion is based on (e.g., associated with) either the first duplex type (e.g., non-SBFD symbols) or the second duplex type (e.g., SBFD symbols).

In some examples, if the occasion is on or uses non-SBFD symbol(s), the WTRU may transmit or receive the physical channel transmission or signal using a first-ordered TCI-state (e.g., the first TCI-state). If the occasion is on or uses SBFD symbol(s), the WTRU may transmit or receive the physical channel or signal using a second-ordered TCI-state (e.g., the second TCI-state). If the physical channel or signal spans across different symbol types in a given transmission occasion, e.g., when the physical channel or signal includes N1+N2 symbols (where N1 symbols are on SBFD symbols and (subsequent) N2 symbols are on non-SBFD symbols), the WTRU may determine to apply either the first-ordered or second-ordered TCI-state based on at least one condition.

In one condition, if N1<N2 (or N1<=N2), the WTRU may transmit or receive the physical channel or signal using a first-ordered TCI-state (e.g., the first TCI-state, based on the larger number of non-SBFD symbols of the given transmission occasion).

In one condition, if N1>N2 (or N1>=N2), the WTRU may transmit or receive the physical channel transmission or signal using a second-ordered TCI-state (e.g., the second TCI-state, based on the larger number of SBFD symbols of the given transmission occasion)).

In one condition, if at least N_threshold1 symbols (e.g., where N_threshold1 may be configured or indicated) are present (e.g., included) in the given transmission occasion, the WTRU may transmit or receive the physical channel transmission or signal using a first-ordered TCI-state (e.g., the first TCI-state, based on the number of non-SBFD symbols which is more than (or equal to) the N_threshold1 symbols, being present in the given transmission occasion). This may provide benefits, in terms of at least "load balancing" effects across different symbol types, in that the BS may control the WTRU to prioritize the first FD symbol type (e.g., non-SBFD) based operation, e.g., as long as more than N_threshold1 is included in the given transmission occasion.

In one condition, if at least N_threshold2 symbols (e.g., where N_threshold2 may be configured or indicated) are present (e.g., included) in the given transmission occasion, the WTRU may transmit or receive the physical channel transmission or signal using a second-ordered TCI-state (e.g., the second TCI-state, based on the number of SBFD symbols which is more than (or equal to) the N_threshold2 symbols, being present in the given transmission occasion). This may provide benefits, in terms of at least "load balancing" effects across different symbol types, in that the BS may control the WTRU to prioritize the second FD symbol type (e.g., SBFD) based operation, e.g., as long as more than N_threshold2 is included in the given transmission occasion.

In some examples, e.g., for "dynamic SBFD operation", if the occasion is associated with a first SBFD configuration for SBFD symbol(s), the WTRU may transmit or receive the physical channel transmission or signal using a first-ordered TCI-state (e.g., the first TCI-state). If the occasion is associated with a second SBFD configuration for SBFD symbol(s), the WTRU may transmit or receive the physical channel or signal using a second-ordered TCI-state (e.g., the second TCI-state).

If a physical channel or signal (or one or particular types of a physical channel or signal) is not applicable (e.g., should not be applied, shall not be applied) for "symbol-type-specific" TCI-state selection, the WTRU may determine (or may receive an indication or configuration for a rule) that at least one TCI-state of the ordered set of TCI-states (associated with a TCI-codepoint) is applied (e.g., used), e.g., regardless of a determined transmission or reception occasion of the physical channel or signal. For example, the WTRU may determine (or may receive an indication or configuration for a rule) that the at least one of TCI-states may be the first-ordered TCI-state. Based on the determination, the WTRU may transmit or receive the physical channel transmission or signal using the first-ordered TCI-state, when the occasion of the physical channel or signal is on either non-SBFD or SBFD symbols (e.g., regardless of symbol type). In some examples, if the physical channel or signal is a PRACH, the WTRU may transmit the PRACH using the first TCI-state and a determined transmission power based on a set of PC parameters associated with the first TCI-state, when the transmission occasion of the PRACH is on either non-SBFD or SBFD symbols (e.g., regardless of symbol type).

A first physical channel or signal that is applicable for "symbol-type-specific" TCI-state selection may be applied with a selective TCI-state depending on an FD symbol type on a current transmit or reception occasion, while a second physical channel or signal that is excluded (e.g., by the explicit indication/configuration) from "symbol-type-specific" TCI-state selection may continue to use at least one fixed TCI-state (e.g., the first-ordered TCI-state) regardless of an FD symbol type on a current transmit or reception occasion. This may provides benefits in terms of robustness (and/or legacy compatibility, etc.), e.g., for PRACH transmission, for particular SRS transmission types (e.g., usage set to other than CB, NCB), and/or for a particular type of PDCCH reception, etc.

Examples PRACH transmission behavior are described herein. A WTRU may receive, identify, or be configured with time domain resource allocations for one or more (e.g., consecutive) RACH Occasions (RO) based on the higher-layer parameter prach-ConfigurationIndex, or by msgA-PRACH-ConfigurationIndex, if configured. These parameters may denote a PRACH configuration index corresponding to one or more tables that include random access parameters.

The WTRU may be configured with one or more parameters as described in the following paragraphs. The WTRU may be configured with a preamble format. For example, the WTRU may be configured with preamble format that may refer to one of the possible formats, namely: A1, A2, A3, B1, A1/B1, A2/B2, A3/B3, B4, C0, C2. The preamble format may identify the corresponding Cyclic Prefix (CP) duration, sequence part duration, guard time duration (if applicable), etc.

The WTRU may be configured with a frame number, subframe number, and/or slot number. For example, the WTRU may be configured with time-domain allocations, subframe number, and/or slot numbers during which the ROs may be configured. Using this parameter, the WTRU may determine the RO slot, for example within the corresponding subframe, where the WTRU may transmit a PRACH transmission on the configured PRACH in one or more of the determined ROs.

The WTRU may be configured with a starting symbol. For example, the WTRU may determine the symbol-level index corresponding to the starting position of the first RO transmission within the indicated and/or configured RO slot.

The WTRU may be configured with a number of PRACH slots within a 60 KHz slot. For example, the WTRU may receive an indication or configuration information with the number of PRACH slots within a reference 60 kHz slot. In some examples, the WTRU may be configured with the number of PRACH slots for high SCS values such as 120 KHz, 480 kHz, 960 kHz, etc., where the WTRU may consider the 60 KHz PRACH slot as the reference slot.

The WTRU may be configured with a number of time-domain PRACH occasions within a PRACH slot ($N_t^{RA,slot}$). For example, the WTRU may be configured with the number of consecutive ROs that are located within a PRACH slot in time domain.

The WTRU may be configured with a PRACH duration. For example, the WTRU may be configured with the duration of an RO in terms of a number of symbols.

A WTRU may receive the frequency domain resource allocations for the ROs based on one or more higher-layer parameters, described as follows. The parameters msg1-FrequencyStart or msgA-RO-FrequencyStart, if configured, may indicate the offset of the lowest PRACH transmission occasion in frequency domain with respect to the PRB 0.

The parameters msg1-FDM or msgA-RO-FDM, if configured, may indicate the number of PRACH transmission occasions that are FDMed in one time-domain RO.

The WTRU may receive, identify, or be configured with the number of ROs in frequency domain (M) per each time-domain PRACH occasion based on the higher layer parameter msg1-FDM, msg1-FDM-16, or msgA-RO-FDM, if configured, where msg1-FDM={one, two, four, eight}. The WTRU may number the PRACH frequency resources $n_{RA}=\{0,1,\ldots,M-1\}$, starting from the lowest frequency, in increasing order in the initial uplink BWP during the initial access or the active uplink BWP otherwise.

A WTRU may determine the association and mapping between the SS/PBCH block indexes and PRACH transmission occasions based on a parameter, such as the higher layer parameter ssb-perRACH-OccasionAndCB-PreamblesPerSSB={⅛, ¼, ½, 1, 2, 4, 8, 16}. The parameter may indicate the number of SS/PBCH block indexes associated with a PRACH transmission occasion in addition to the number of preambles per SS/PBCH block index per PRACH occasion.

A WTRU may monitor, receive, detect, and/or select an SSB in an SSB burst. In some examples, the WTRU may select the SSB during initial access procedure or as part of beam failure detection (BFR) procedure. For example, the WTRU may measure the received power (e.g., RSRP) based on the received SSBs and select an SSB based on the measured received power (e.g., with highest RSRP). The WTRU may use the selected SSB for connecting to a cell and/or for PRACH preamble transmission to the cell. The WTRU may receive a physical broadcast channel (PBCH). The PBCH may carry system information. The PBCH may include or carry a master information block (MIB). The term MIB may be used to represent the content, information, payload, and/or bits carried by the PBCH. PBCH and MIB may be used interchangeably herein. The PBCH may be part of an SS/PBCH block (SSB). The SSB may be associated with an SSB index. A Node-B, cell, TRP, etc. may transmit one or more SSBs where each SSB may have an SSB index.

In some examples, the WTRU may use one or more configuration information received as part of PBCH, MIB, and/or SSB to determine the resources to monitor, receive and/or detect Control Resource Set Zero (CORESET0) for receiving Type0-PDCCH Common Search Space (CSS). The Type0-PDCCH CSS may include indications to one or more System Information Blocks (SIB), for example SIB1.

In some examples, a WTRU may receive, be configured with, and/or receive an indication of one or more parameters indicating the transmitted SSBs in an SSB burst. For example, the WTRU may receive an indication (e.g., via SIB1 and/or RRC), for example ssb-PositionsInBurst, that may include a bitmap to indicate the transmitted SSBs within the SSB burst.

A WTRU may be configured with one or more RACH occasion (RO) types. In some examples, the WTRU may be configured with a Type 1 RO. For example, the Type 1 ROs may coincide with one or more TDD UL-only time instances (e.g., associated with the first FD symbol type, e.g., on non-SBFD symbols). In some examples, the WTRU may be configured with a Type 2 RO. For example, the Type 2 ROs may coincide with one or more SBFD and/or supplementary time instances (e.g., associated with the second FD symbol type, e.g., on SBFD symbols). In some examples, the Type 1 ROs may be indicated as non-SBFD ROs, legacy ROs, etc. In some examples, the Type 2 ROs may be indicated as SBFD ROs, additional ROs, etc.

The WTRU may be configured with a PRACH transmission based on one or more of the configured RO types. In some examples, the random access resources corresponding to different RO types may be mutually exclusive.

In some examples, a WTRU may receive a first set of configuration information for a random-access procedure using the Type 1 ROs and a second set of configuration information for a random-access procedure using the Type 2 ROs. In some examples, the WTRU may receive a first set of configurations for a random access procedure using the Type 1 ROs, where the WTRU may determine, be configured, and/or indicated to use the received first set of configuration information for Type 2 ROs as well. As such, in an example, in case a first RO coincides in a non-SBFD (e.g., UL-only TDD) symbol, the WTRU may consider the first RO as a non-SBFD (e.g., legacy) RO. In some examples, if a second RO coincides in an SBFD symbol, the WTRU may consider the second RO as an SBFD (e.g., additional) RO.

For example, the WTRU may receive the configuration information via SIB, RRC, MAC-CE, DCI, or other logically equivalent signaling. In some examples, the WTRU may receive the indications as part of SIB during initial access. In some examples, the WTRU may receive the indications via RRC, e.g., for BFR procedure. In some examples, the WTRU may receive the indications via MAC-CE, e.g., as part of PDCCH order, or via other logically equivalent signaling.

In some examples, the RACH configurations may include information on time and frequency resources where the ROs may be scheduled. For example, the RACH configurations may include indications as to the number of ROs that may be mapped in frequency domain per each configured RO time instance. That is, the WTRU may receive configurations as to the number of ROs that are FDM-ed in one RO time instance (e.g., via msg1-FDM).

Example solutions for 4-step RACH procedures are described herein. In some solutions, a WTRU may transmit a PRACH (e.g., msg1 of a random access procedure) using a first TCI-state (e.g., corresponding to the first-ordered TCI-state, of more than one TCI-states associated with a TCI-codepoint), e.g., when a transmission occasion of the PRACH is based on the first FD symbol type (e.g., on non-SBFD symbol(s)), or regardless of whether the transmission occasion is overlapped with which FD symbol type. The WTRU may receive a response (e.g., from a BS, base station, TRP) via a random access response (RAR), e.g., msg2 in response to the msg1 transmitted by the WTRU, which may indicate (e.g., schedule) a UL resource (e.g., msg3, an initial PUSCH, etc.) to use for a transmission by the WTRU.

In some example solutions, the WTRU may determine that a transmission occasion of the UL resource is overlapped with the first FD symbol type (e.g., on non-SBFD symbol(s). Then, the WTRU may transmit a PUSCH transmission (e.g., the initial PUSCH transmission, msg3), based on the RAR, using a second TCI-state (e.g., corresponding to the second-ordered TCI-state, of the more than one TCI-states associated with the TCI-codepoint). In response to the transmitted PUSCH transmission, the WTRU may receive confirmation (e.g., msg4, from the BS) from which the WTRU may determine that the random access procedure is completed, e.g., that a connection (and/or synchronization in communications) is established with the BS.

In some example solutions, the WTRU may determine that a transmission occasion of the UL resource is overlapped with the second FD symbol type (e.g., on SBFD symbol(s)). Then, the WTRU may transmit a PUSCH transmission (e.g., the initial PUSCH transmission, msg3), based on the RAR, using a first TCI-state (e.g., corresponding to the first-ordered TCI-state, of the more than one TCI-states associated with the TCI-codepoint). In response to the transmitted PUSCH transmission, the WTRU may receive a confirmation (e.g., msg4, from the BS) which the WTRU may determine that the random access procedure is completed, e.g., a connection (and/or synchronization in communications) is established with the BS.

In some example solutions, when the WTRU determines that a transmission occasion of the UL resource is overlapped with the second FD symbol type (e.g., on SBFD symbol(s)), e.g., if explicitly configured or enabled by the BS, the WTRU may transmit a PUSCH transmission (e.g., the initial PUSCH transmission, msg3), based on the RAR, using a second TCI-state (e.g., corresponding to the second-ordered TCI-state, same as that for the corresponding PRACH transmission). In response to the transmitted PUSCH, the WTRU may receive confirmation (e.g., msg4, from the BS) from which the WTRU may determine that the random access procedure is completed, e.g., a connection (and/or synchronization in communications) is established with the BS.

In some solutions, when the WTRU determines that a transmission occasion of the UL resource is overlapped with the second FD symbol type (e.g., on SBFD symbol(s)), e.g., if explicitly configured or enabled by the BS, the WTRU may transmit a PUSCH transmission (e.g., the initial PUSCH transmission, msg3), based on the RAR, using either the first or second TCI-state which is the same one used for the corresponding PRACH (e.g., msg1) transmission. In some examples, if the first TCI-state is used for msg1 transmission (e.g., associated with the first FD symbol type), the WTRU may transmit the PUSCH transmission (e.g., msg3) using the first TCI-state, e.g., regardless of a symbol type of a transmission occasion of the PUSCH. In some examples, if the second TCI-state is used for msg1 transmission (e.g., associated with the second FD symbol type), the WTRU may transmit the PUSCH transmission (e.g., msg3) using the second TCI-state, e.g., regardless of a symbol type of a transmission occasion of the PUSCH. In response to the transmitted PUSCH transmission, the WTRU may receive a confirmation (e.g., msg4, from the BS) which the WTRU may determine that the random access procedure is completed, e.g., a connection (and/or synchronization in communications) is established with the BS.

Example solutions for 2-step RACH procedures are described herein. In some solutions, a WTRU may transmit a PRACH transmission and a linked PUSCH transmission (e.g., msgA for 2-step RACH) using a first TCI-state (e.g., corresponding to the first-ordered TCI-state, of more than one TCI-states associated with a TCI-codepoint), if at least one condition is met. One condition may be that a transmission occasion of the PRACH transmission is based on the first FD symbol type (e.g., on non-SBFD symbol(s)), e.g., regardless of a symbol type on a transmission occasion of the linked PUSCH. One condition may be that a transmission occasion of the linked PUSCH transmission is based on the first FD symbol type (e.g., on non-SBFD symbol(s)), e.g., regardless of a symbol type on a transmission occasion of the PRACH. One condition may be that both transmission occasions of the PRACH transmission and the linked PUSCH transmission are based on the first FD symbol type (e.g., on non-SBFD symbol(s)).

In some example solutions, a WTRU may transmit a PRACH transmission and a linked PUSCH transmission (e.g., msgA for 2-step RACH) using a second TCI-state (e.g., corresponding to the second-ordered TCI-state, of more than one TCI-states associated with a TCI-codepoint), if at least one condition is met. One condition may be that a transmission occasion of the PRACH transmission is based on the second FD symbol type (e.g., on SBFD symbol(s)), e.g., regardless of a symbol type on a transmission occasion of the linked PUSCH transmission. One condition may be that a transmission occasion of the linked PUSCH is based on the second FD symbol type (e.g., on SBFD symbol(s)), e.g., regardless of a symbol type on a transmission occasion of the PRACH. One condition may be that both transmission occasions of the PRACH transmission and the linked PUSCH transmission are based on the second FD symbol type (e.g., on SBFD symbol(s).

These solutions may provide benefits in terms of robustness (e.g., in a random access procedure, in a 2-step RACH procedure) in that both the PRACH transmission and the linked PUSCH transmission are based on or use the same TCI-state (e.g., either the first-ordered or second-ordered TCI-state).

UL transmission behaviors based on separated SRS configurations being applied for different duplex symbol types are described herein. In some solutions, a determination of a configured SRS resource set associated with one of FD symbol types may be performed. In some solutions, a WTRU may receive configuration information for an SRS resource set (or an SRS resource, or an SRS configuration, etc.) The WTRU may determine the SRS resource set is associated with either a first FD symbol type (e.g., applicable for non-SBFD symbols) or a second FD symbol type (e.g., applicable for SBFD symbols). The determination that the SRS resource set is associated with either one of FD symbol types may be based on at least one characteristic, condition, or parameter.

The determination may be based on an explicit higher-layer parameter (e.g., by RRC, and/or MAC-CE) indicating whether the SRS resource set (or an SRS resource, or an SRS configuration, etc.) is to be applied for either a first FD symbol type (e.g., applicable for non-SBFD symbols) or a second FD symbol type (e.g., applicable for SBFD symbols), e.g., via parameter(s) named "followUTCIfromFDSymbolType", "followTCIfromSBFDSymbolType", and/or the like, e.g., configurable via the SRS resource set related configuration The determination may be made when a parameter is received (e.g., configured or indicated), which enables separating at least one power control (PC) parameter across the first FD symbol type (e.g., non-SBFD symbols) and the second FD symbol type (e.g., SBFD symbols). The at least one PC parameter may include {P0, P_offset, alpha, a PL-RS, and/or a CL-index}.

The determination may be made when a parameter is received (e.g., configured or indicated), which enables separating at least one spatial-domain parameter across the first FD symbol type (e.g., non-SBFD symbols) and the second FD symbol type (e.g., SBFD symbols). The at least one spatial-domain parameter may include a TCI-state, an RS index, a beam index, and/or an RS associated with a TCI-state (e.g., where the WTRU may determine the RS that has a QCL association (or relation) with a second RS configured in the TCI-state).

The determination may be made when the WTRU receives a configuration or indication, e.g., via an RRC message, a MAC-CE (e.g., a TCI-activation MAC-CE, or a separate MAC-CE, etc.), and/or via other logically equivalent signaling, that a TCI codepoint (e.g., at least one TCI codepoint) is mapped to more than one TCI-states. A first TCI-state of the more than one TCI-states may be associated with a first FD symbol type (e.g., non-SBFD symbols) and a second TCI-state of the more than one TCI-states may be associated with a second FD symbol type (e.g., SBFD symbols)

The determination may be made when an existing parameter of the configured SRS resource set (or an SRS resource, or an SRS configuration, etc.) is set a pre-defined value (or a new value) indicating the association with one of the FD symbol types. In some examples, the existing parameter may be a 'usage' parameter, e.g., based on examples illustrated in FIG. 6, introduced and described in paragraphs above, where a new value of the parameter, e.g., "codebook (CB)-SBFD", "non-codebook (NCB)-SBFD", "WTRU-to-WTRU-CLI", etc. may be added in the parameter, e.g., 'usage'=enumerated {beam management (BM), CB, NCB, antenna switching (AS), CB-SBFD, NCB-SBFD, WTRU-WTRU-CLI}. If the new value (e.g., CB-SBFD, NCB-SBFD, and/or WTRU-WTRU-CLI) is indicated in the 'usage' parameter, the WTRU may determine that the configured SRS resource set is associated with the second FD symbol type (e.g., SBFD symbols). Otherwise (e.g., when an existing value (e.g., BM, CB, NCB, and/or AS) is indicated, the WTRU may determine that the configured SRS resource set is associated with the first FD symbol type (e.g., non-SBFD symbols). In some examples, the existing parameter may be a 'applyIndicatedTCI-State' parameter, e.g., based on examples illustrated in FIG. 6, introduced and described in paragraphs above, where a pre-defined (or preconfigured) value of the parameter (e.g., 'second' (or 'first')) may be used for the association with one FD symbol type (e.g., the second FD symbol type, e.g., SBFD symbols). In some examples, if the pre-defined value (e.g., 'second') is indicated in the 'applyIndicatedTCI-State' parameter, the WTRU may determine that the configured SRS resource set is associated with the second FD symbol type (e.g., SBFD symbols). Otherwise (e.g., when a value of 'first' is indicated in the 'applyIndicatedTCI-State' parameter), the WTRU may determine that the configured SRS resource set is associated with the first FD symbol type (e.g., non-SBFD symbols). This may provide benefits in that the WTRU determines a clear association based on an ordered position of the more than one TCI-states (mapped in a TCI-code-point, activated by a MAC-CE, e.g., by a new MAC-CE, by other logically equivalent signaling or by reusing an existing TCI-activation MAC-CE based on the re-interpretation across different symbol types, instead of across different TRPs, when the WTRU receives the parameter to apply the re-interpretation).

In some examples, the 'usage' parameter may indicate "WTRU-to-WTRU CLI". If the WTRU is configured and/or indicated with a 'usage' parameter to be "WTRU-to-WTRU CLI" for one or more SRS resources (and/or corresponding SRS resource set), the WTRU may be configured with one or more configuration information and/or indications for one or more corresponding SRS transmissions. For example, the WTRU may determine, be configured, and/or indicated with a third set of TCI-states, to be used for corresponding SRS transmissions, e.g., where the SRS transmission(s) may be used for being received by other (e.g., potential victim) WTRUs in terms of WTRU-to-WTRU CLI handling, e.g., which may require a different TCI-state (at least in term of beam direction control) of the third set of TCI-states.

In some examples, a WTRU may receive one or more DCIs including one or more DCI field, for example, for unified TCI-state indications. In some examples, the DCI field may be a TCI field. The WTRU may receive the mapping between a codepoint (of the DCI field) and one or more TCI states, e.g., via RRC, MAC-CE, DCI, etc. signal-ing. For example, a codepoint may be mapped to more than one TCI-states, where the WTRU may use the configured and/or indicated TCI states based on one or more modes of operation. In some examples, the WTRU may be configured with three TCI-states associated with an indicated and/or configured codepoint. For example, the WTRU may be configured with one or more modes of operation. In some examples, a first mode of operation may be based on transmission and/or reception based on non-SBFD configu-rations and/or resources; a second mode of operation may be based on transmission and/or reception based on SBFD configurations and/or resources, and so forth. As such, in some examples, the WTRU may use the configured and/or indicated first TCI-state associated with the indicated code-point, in case the WTRU operates based on the first mode of operation. In some examples, the WTRU may use the configured and/or indicated second TCI-state associated with the indicated codepoint, in case the WTRU operates based on the second mode of operation.

In some examples, the WTRU may use the third config-ured and/or indicated TCI-states associated with the indi-cated codepoint, in case the WTRU determines, is config-ured, and/or indicated to operate based on the first or the second modes of operation and if the WTRU is configured with SRS transmission with 'usage' parameter configured to be "WTRU-to-WTRU CLI". As such, the WTRU may use the determined, configured, and/or indicated spatial filter associated with the third TCI state for transmission of the corresponding SRS resources (and/or the corresponding SRS resource set).

WTRU behavior when transmitting an SRS and subse-quent PUSCH transmission is described herein. The WTRU may transmit a first SRS using a configured first SRS resource (where the first SRS resource may be included in a configured first SRS resource set, which may be associated with the first FD symbol type), based on a transmission occasion (e.g., symbol, slot, time unit) indicated by the first SRS resource (or resource set). The WTRU may determine or be configured to determine whether the transmission occasion is on or uses symbols of the first FD symbol type (e.g., non-SBFD symbol(s)) and/or whether it is the same as (e.g., aligned with, associated with (e.g., by a configured rule)) a symbol type (e.g., the first FD symbol type) con-figured in (or determined by) the first SRS resource (or resource set) based on at least one of the described rules for determining the SRS resource set being associated with either one of FD symbol types.

The WTRU may transmit a second SRS using a config-ured second SRS resource (where the second SRS resource may be included in a configured second SRS resource set, e.g., associated with the second FD symbol type), based on a transmission occasion (e.g., symbol, slot, time unit) indi-cated by the second SRS resource (or resource set). The WTRU may (be configured to) determine whether the trans-mission occasion is on or uses symbols of the second FD symbol type (e.g., non-SBFD symbol(s)) and whether it is the same as (e.g., aligned with, associated with (e.g., by a configured rule) a symbol type (e.g., the second FD symbol type) configured in (or determined by) the second SRS resource (or resource set) based on at least one of the disclosed rules for determining the SRS resource set being associated with either one of FD symbol types.

The WTRU may transmit or be configured to transmit an SRS (e.g., the first SRS and/or the second SRS) if the determined FD symbol type in the transmission occasion is the same as (e.g., aligned with, associated with (e.g., by a configured rule) the symbol type configured in (or deter-mined by) the corresponding SRS resource (or resource set). In some examples, (e.g., when the determined FD symbol type is not aligned with the symbol type configured in the corresponding SRS resource (set), the WTRU may skip transmitting the SRS on the transmission occasion. The WTRU may continue to transmit the SRS in a second transmission occasion if an FD symbol type in the second transmission occasion is aligned with the symbol type configured in the corresponding SRS resource (set).

In some examples, the WTRU that is configured and/or indicated with a first symbol type for one or more configured and/or indicated SRS resources and/or sets, may consider (e.g., determine) the symbols with the first symbol type as 'valid' for the corresponding SRS transmission. In some examples, the WTRU that is configured and/or indicated with a first symbol type for one or more configured and/or indicated SRS resources (sets), may consider (e.g., deter-mine) the symbols with a second symbol type as 'invalid' for the corresponding SRS transmission. For example, a WTRU may determine, be configured and/or indicated with a first SRS resource, SRS resource set, and/or one or more first TCI-states corresponding to transmission of the first SRS in SBFD symbols and based on SBFD configurations and/or resources. As such, the WTRU may consider (e.g., deter-mine) the SBFD symbols as 'valid' and non-SBFD symbols to be 'invalid' for the transmission of the configured and/or indicated first SRS. In some examples, a WTRU may determine, be configured with and/or receive an indication of a second SRS resource, SRS resource set, and/or one or more second TCI-states corresponding to transmission of the second SRS resource and/or set in non-SBFD symbols and based on non-SBFD configurations and/or resources. As such, the WTRU may consider (e.g., determine) the SBFD symbols to be 'invalid' and non-SBFD symbols as 'valid' for the transmission of the configured and/or indicated second SRS.

The WTRU may receive a UL grant (e.g., via DCI) scheduling a PUSCH transmission and indicating at least one of an SRS resource(s) (e.g., via an SRS resource indicator (SRI)), information on one or more transmission occasions (each corresponding to either the first or second FD symbol type) of the PUSCH transmission, a transmit precoding matrix indication(s) (TPMI), and/or a TCI-state (e.g., for PUSCH beam determination). In a solution, the WTRU may (be configured to) determine whether the indicated SRI is pointing to either the first SRS resource or the second SRS resource based on whether a transmission occasion of the one or more transmission occasions is associated to either the first or second FD symbol type.

In some examples, the WTRU may determine a first transmission occasion of the scheduled PUSCH transmission is associated with the first FD symbol type (e.g., is on non-SBFD symbol(s). Based on the determination, the WTRU may determine the indicated SRI is the first SRS resource, and/or may transmit the PUSCH transmission on the first transmission occasion based on using at least one of UL transmission parameters such as spatial-domain filter coefficients and/or transmission power level that was applied for the first SRS resource (e.g., which was transmitted on the first FD symbol type) and/or the indicated TPMI(s) associated with the first SRS resource.

In some examples, the WTRU may determine a second transmission occasion of the scheduled PUSCH transmission is associated with the second FD symbol type (e.g., is on SBFD symbol(s)). Based on the determination, the WTRU may determine the indicated SRI is the second SRS resource, and/or may transmit the PUSCH transmission in the second transmission occasion using at least one of UL transmission parameters such as spatial-domain filter coefficients and/or transmission power level that was applied for the second SRS resource (e.g., which was transmitted on the second FD symbol type) and/or the indicated TPMI(s) associated with the second SRS resource.

WTRU behavior for reinterpreting a SRS resource set indicator is described herein. The WTRU may transmit a first SRS of a configured first SRS resource (where the first SRS resource may be included in a configured first SRS resource set, e.g., associated with the first FD symbol type), based on a transmission occasion (e.g., symbol, slot, time unit) indicated by the first SRS resource (or resource set). In some examples, the first SRS resource set may be further be indicated via an SRS resource set indicator (SRSI) indicating a first value (e.g., SRSI=1). The WTRU may determine or be configured to determine whether the transmission occasion is on the first FD symbol type (e.g., non-SBFD symbol(s)) and whether it is the same as (e.g., aligned with, associated by a configured rule with) a symbol type (e.g., the first FD symbol type) configured in (or determined by) the first SRS resource (or resource set) based on at least one of the disclosed rules for determining the SRS resource set being associated with either one of FD symbol types.

The WTRU may transmit a second SRS of a configured second SRS resource (where the second SRS resource may be included in a configured second SRS resource set, e.g., associated with the second FD symbol type), based on a transmission occasion (e.g., symbol, slot, time unit) indicated by the second SRS resource (or resource set). In some examples, the second SRS resource set may be further be indicated via an SRS resource set indicator (SRSI) indicating a second value (e.g., SRSI=2). The WTRU may determine or be configured to determine whether the transmission occasion is on the second FD symbol type (e.g., non-SBFD symbol(s)) and whether it is the same as (e.g., aligned with, associated with (e.g., by a configured rule)) a symbol type (e.g., the second FD symbol type) configured in (or determined by) the second SRS resource (or resource set) based on at least one rule for determining the SRS resource set being associated with either one of FD symbol types.

The WTRU may transmit or be configured to transmit an SRS (e.g., the first SRS, the second SRS) if the determined FD symbol type in the transmission occasion is the same as (e.g., aligned with, associated by a configured rule with) the symbol type configured in (or determined by) the corresponding SRS resource (or resource set). In some examples (e.g., when the determined FD symbol type is not aligned with the symbol type configured in the corresponding SRS resource (set)), the WTRU may skip transmitting the SRS on the transmission occasion. The WTRU may continue to transmit the SRS in a second transmission occasion if an FD symbol type on the second transmission occasion is aligned with the symbol type configured in the corresponding SRS resource (set).

The WTRU may receive a UL grant (e.g., DCI) scheduling a PUSCH transmission (e.g., associated with multiple SRS resource sets, e.g., each being transmitted from a different WTRU-panel, forming a "simultaneous Tx from WTRU-multi-panels (STxMP)", or each being associated with a different Tx occasion as a part of a TDM-based repetition scheme). The UL grant may indicate at least one of the SRS resource(s) (e.g., via an SRS resource indicator (SRI)), SRS resource set(s) (e.g., via SRSI(s)), information on one or more transmission occasions (each corresponding to either the first or second FD symbol type) of the PUSCH, transmit precoding matrix indication(s) (TPMI), and/or TCI-state(s) (e.g., for PUSCH beam determination).

Table 1 illustrates an example of information as may be indicated by an SRSI, carried in an UL grant. As shown in Table 1, the SRSI may include a bit field that is mapped to an index, which carries the SRS resource set indication as described above.

TABLE 1 example of an SRS resource set indication, provided via an SRSI, in a UL grant

| Bit field mapped to index | SRS resource set indication |
|---|---|
| 0 | SRS resource indicator field and Precoding information and number of layers field are associated with the first SRS resource set; Second SRS resource indicator field and Second Precoding information field are reserved; If there are two indicated joint/UL TCI states, the first indicated joint/UL TCI state is applied to the corresponding PUSCH transmission occasions. |
| 1 | SRS resource indicator field and Precoding information and number of layers field are associated with the second SRS resource set; |

TABLE 1-continued example of an SRS resource set indication, provided via an SRSI, in a UL grant

| Bit field mapped to index | SRS resource set indication |
|---|---|
|  | Second SRS resource indicator field and Second Precoding information field are reserved; If there are two indicated joint/UL TCI states, the second indicated joint/UL TCI state is applied to the corresponding PUSCH transmission occasions. |
| 2 | SRS resource indicator field and Precoding information and number of layers field are associated with the first SRS resource set; Second SRS resource indicator field and Second Precoding information field are associated with the second SRS resource set; If there are two indicated joint/UL TCI states, the first indicated joint/UL TCI state is applied to the PUSCH transmission occasions/antenna ports associated with the first SRS resource set, and the second indicated joint/UL TCI state is applied to the PUSCH transmission occasions/antenna ports associated with the second SRS resource set. |
| 3 | SRS resource indicator field and Precoding information and number of layers field are associated with the first SRS resource set; Second SRS resource indicator field and Second Precoding information field are associated with the second SRS resource set; If there are two indicated joint/UL TCI states, the first indicated joint/UL TCI state is applied to the PUSCH transmission occasions associated with the first SRS resource set, and the second indicated UL TCI state is applied to the PUSCH transmission occasions associated If multipanelScheme is configured, this row is reserved. |

NOTE 1:
The first and the second SRS resource sets are respectively the ones with lower and higher srs-ResourceSetId of the two SRS resources sets configured by higher layer parameter srs-ResourceSetToAddModList or srs-ResourceSet-ToAddModListDCI-0-2, and associated with the higher layer parameter usage of value 'nonCodeBook' if txConfig=nonCodebook or 'codebook' if txConfig=codebook. When only one SRS resource set is configured by higher layer parameter srs-ResourceSetToAddModList or srs-ResourceSetToAddModListDCI-0-2, and associated with the higher layer parameter usage of value 'codebook' or 'nonCodeBook' respectively, the first SRS resource set is the SRS resource set. The association of the first and second SRS resource sets to PUSCH repetitions for each bit field index value is as defined in Clause 6.1.2.1 of TS 38.214, incorporated herein by reference.
NOTE 2:
For DCI format 0_2, the first and second SRS resource sets configured by higher layer parameter srs-ResourceSet-ToAddModListDCI-0-2 are composed of the first $N_{SRS,0\_2}$ SRS resources together with other configurations in the first and second SRS resource sets configured by higher layer parameter srs-ResourceSetToAddModList, if any, and associated with the higher layer parameter usage of value 'codebook' or 'nonCodeBook', respectively, except for the higher layer parameters 'srs-ResourceSetId' and 'srs-ResourceIdList'.

In some solutions, the WTRU may determine or be configured to determine a UL transmission scheme based on the indicated value of a 'SRS resource set indicator (SRSI)' field in the UL grant, by re-interpreting the following "two indicated TCI states (e.g., across TRP-domain)" as "the first-ordered and second-ordered TCI-states (e.g., across symbol-domain, e.g., across FD-symbol-type-domain)". The WTRU may re-interpret the SRS resource set indication according to at least one of the following: (1) the first SRS resource set and the first indicated joint/UL TCI state are not for a first TRP (e.g., based on antenna ports associated with the first SRS resource set) but for the first FD symbol type (e.g., on non-SBFD symbols); or (2) the second SRS resource set and the second indicated joint/UL TCI state are not for a second TRP (e.g., based on antenna ports associated with the second SRS resource set) but for the second FD symbol type (e.g., on SBFD symbols).

When the WTRU is configured with a first repetition configuration (e.g., indicating that repeated transmissions and/or receptions across different FD symbol types are restricted within one FD symbol type (e.g., only one of either the first FD symbol type (on non-SBFD symbols) or the second FD symbol type (on SBFD symbols)), at least one bit field (e.g., 'Bit field index=0', 'Bit field index=1'), e.g., in an SRSI field, may be re-interpreted to which FD symbol type is valid.

In some examples, if the 'Bit field index=0' in the SRSI field, the WTRU may determine that transmissions (and/or receptions) across repeated occasions are valid (e.g., only) in symbols corresponding to (e.g., associated with, overlapped to) the first FD symbol type (e.g., non-SBFD symbols). The WTRU may determine that indicated SRI field(s) and/or TPMI field(s), e.g., in the same DCI indicating the SRSI, are based on the first SRS resource set (e.g., that is associated with the first FD symbol type). The WTRU may determine the indicated SRI(s) of the SRI field(s) from (e.g., within) the first SRS resource set (not from the second SRS resource set). The WTRU may transmit a PUSCH transmission using a determined PUSCH precoder based on the indicated SRI(s) from the first SRS resource set and/or the indicated TPMI(s) where its indicated matrix ($S_{port}$ by $R_{layer}$) may be applied on the WTRU's $S_{port}$ Tx antenna ports that were used for the SRS transmission based on the indicated SRI being mapped from the first SRS resource set.

In some examples, if the 'Bit field index=1' in the SRSI field, the WTRU may determine that transmissions (and/or receptions) across repeated occasions are valid (e.g., only) in symbols corresponding to (e.g., associated with, overlapped to) the second FD symbol type (e.g., SBFD symbols). The WTRU may determine that indicated SRI field(s) and/or TPMI field(s), e.g., in the same DCI indicating the SRSI, are based on the second SRS resource set (e.g., that is associated with the second FD symbol type). The WTRU may determine the indicated SRI(s) of the SRI field(s) from (e.g., within) the second SRS resource set (not from the first SRS resource set). The WTRU may transmit a PUSCH transmission using a determine PUSCH precoder based on the indicated SRI(s) from the second SRS resource set and/or the indicated TPMI(s) where its indicated matrix ($S_{port}$ by $R_{layer}$) may be applied on the WTRU's $S_{port}$ Tx antenna ports that were used for the SRS transmission based on the indicated SRI being mapped from the second SRS resource set.

When the WTRU is configured with a second repetition configuration (e.g., indicating that repeated transmissions and/or receptions may be applicable across different FD symbol types, at least one bit field (e.g., 'Bit field index=2'), e.g., in an SRSI field, may be re-interpreted to indicate for the WTRU to perform the repeated transmissions (and/or receptions) across the different FD symbol types (e.g., whenever possible, whenever applicable on each transmission occasion in line with the symbol type of each transmission occasion). In some examples, the first SRS resource set may apply to a first symbol type (e.g., on non-SBFD symbol(s) of the repeated transmission (and/or receptions)), and the second SRS resource set may apply to a second symbol type (e.g., on SBFD symbol(s) of the repeated transmission (and/or receptions)).

In a solution, the WTRU may perform or be configured to perform a dynamic fallback to the first repetition configuration, if the WTRU receives either 'Bit field index=0' or 'Bit field index=1' while the WTRU is configured with the second repetition configuration.

In some examples, the WTRU may stop or be configured to stop (or cease during a configured or indicated time duration) transmitting on SBFD symbols of the repeated transmissions (under the second repetition configuration) when the WTRU receives 'Bit field index=0' (indicating to transmit on non-SBFD symbols) in the SRSI field.

In some examples, the WTRU may stop or be configured to) stop (or cease during a configured or indicated time duration) transmitting on non-SBFD symbols of the repeated transmissions (under the second repetition configuration) when the WTRU receives 'Bit field index=1' (indicating to transmit on SBFD symbols) in the SRSI field.

FIG. 7 is a flowchart illustrating a method for applying separate SRS configurations for UL transmissions on SBFD symbols. As shown in FIG. 7, at 701 the WTRU may receive configuration information (e.g., first configuration information) indicating a plurality of sounding reference signal (SRS) resource sets and a plurality of transmission configuration indication (TCI) states. Each of the SRS resource sets may provide one or more transmission occasions, and each of the one or more transmission occasions may include one or more symbols. At 702, the WTRU may receive configuration information (e.g., second configuration information) indicating one or more TCI codepoints. A first one of the one or more TCI codepoints may be associated with a first one of the TCI states and a second one of the TCI states. At 703, the WTRU may determine that the first one of the one or more TCI codepoints is to be applied. At 704, the WTRU may determine that the first one of the TCI states is associated with a non-SBFD mode of operation and the second one of the TCI states is associated with an SFBD mode of operation.

At 705, the WTRU may transmit an SRS using a transmission occasion of a first one of the SRS resource sets. The first one of the plurality of SRS resource sets is associated with at least one of a codebook (CB) or non-codebook (NCB)-based transmission method. If the transmission occasion used for the SRS transmission includes non-SBFD symbols, the SRS is transmitted using the first TCI state and using a transmission power that is determined based on one or more power control parameters associated with the first TCI state. If the transmission occasion includes one or more SBFD symbols, the SRS is transmitted using the second TCI state and using a transmission power that is determined based on one or more power control parameters associated with the second TCI state.

FIG. 8 is a flowchart illustrating another method for applying separate SRS configurations for UL transmissions on SBFD symbols. As shown in FIG. 8, at 801 the WTRU may receive configuration information (e.g., first configuration information) indicating a plurality of sounding reference signal (SRS) resource sets and a plurality of transmission configuration indication (TCI) states. Each of the SRS resource sets may provide one or more transmission occasions, and each of the one or more transmission occasions may include one or more symbols. At 802, the WTRU may receive configuration information (e.g., second configuration information) indicating one or more TCI codepoints. A first one of the one or more TCI codepoints may be associated with a first one of the TCI states and a second one of the TCI states. At 803, the WTRU may determine that the first one of the one or more TCI codepoints is to be applied. At 804, the WTRU may determine that the first one of the TCI states is associated with a non-SBFD mode of operation and the second one of the TCI states is associated with an SFBD mode of operation.

At 805, the WTRU may transmit an SRS using a transmission occasion of a second one of the SRS resource sets. The second one of the plurality of SRS resource sets is associated with at least one of a beam management or antenna switching transmission method. The SRS is transmitted using the first TCI state and using a transmission power that is determined based on one or more power control parameters associated with the first TCI state regardless of whether the transmission occasion includes one or more SBFD symbols.

It should be appreciated by one of ordinary skill in the art that, although various examples and figures are provided that specifically refer to the configuration of SRS resources, resource sets, transmission occasions, and the transmission of SRSs using said resources, resource sets, and occasions, other methods applying similar principles may be possible for transmitting or receiving other types of physical channels or signals.

FIG. 9 is a flowchart illustrating a method performed by a WTRU for applying separate configurations for UL or DL transmissions based on symbols within a transmission or reception occasion. As shown in FIG. 9, at 901, a WTRU may receive information indicating whether symbol-type-specific TCI state selection applies for a physical channel transmission or signal. The physical channel or signal may include, for example, a PUSCH, PUCCH, SRS, PRACH, PDSCH, PDCCH, CSI-RS, DMRS, PTRS, or any other physical channel or signal described herein. The WTRU may be configured with a plurality of TCI states, substantially as described in examples above. For example, the WTRU may receive configuration information indicating a plurality of TCI states, indicating a mapping between codepoints and TCI states, and may determine that a codepoint or a subset of TCI states is to be applied for a given channel or signal. The WTRU may also have received configuration information indicating resources or resource sets including transmission or reception occasions for transmitting or receiving the physical channel transmission or signal. As shown at 902, the WTRU may determine a transmission or reception occasion and whether the occasion uses the first duplex type or the second duplex type. The first duplex type may refer to non-SBFD operation, for example, and the second duplex type may refer to SBFD operation, for example. The WTRU may determine whether the transmission or reception occasion spans across different symbol types, such as SBFD and/or non-SBFD symbols. As shown at 903, the WTRU may transmit or receive the physical channel transmission or signal using a TCI state determined based on at least one of a number of symbols within the transmission or reception occasion that are of the first duplex type or a number of symbols within the transmission or reception occasion that are of the second duplex type. For instance, if the occasion includes only SBFD symbols or only non-SBFD symbols, then the WTRU may simply apply one TCI state or another. In some examples, if the occasion spans across both types of symbols, the WTRU may compare the number of symbols of each type with each other to determine which TCI state to use. If the occasion spans across both types of symbols, the WTRU may compare the number of symbols of one type with a threshold value to determine which TCI state to use. The WTRU may apply one or more rules defined substantially in paragraphs above for determining which TCI state. The WTRU may also apply one or more rules defined substantially in paragraphs above for determining which power control parameters to use.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU), the WTRU comprising:
  a processor; and
  a transceiver;
  the processor and the transceiver configured to receive configuration information indicating at least a first sounding reference signal (SRS) resource set, a first transmission configuration indication (TCI) state, and a second TCI state, wherein the first SRS resource set provides one or more transmission occasions, wherein each of the one or more transmission occasions comprise one or more symbols;
  the processor configured to determine that the first TCI state is associated with a non-subband overlapping full-duplex (SBFD) mode of operation and the second TCI state is associated with an SBFD mode of operation;
  the processor and the transceiver configured to transmit an SRS using a transmission occasion of the first SRS resource set, wherein:
  when the transmission occasion comprises one or more non-SBFD symbols, the SRS is transmitted using the first TCI state and using a transmission power that is determined based on one or more power control parameters associated with the first TCI state; and
  when the transmission occasion comprises one or more SBFD symbols, the SRS is transmitted using the second TCI state and using a transmission power that is determined based on one or more power control parameters associated with the second TCI state.

2. The WTRU of claim 1, the processor and the transceiver configured to receive configuration information indicating a second SRS resource set wherein the second SRS resource set is associated with at least one of a beam management or antenna switching transmission method; and
  the processor and the transceiver configured to transmit another SRS using a transmission occasion of the second SRS resource set, wherein transmission of the another SRS uses one or more non-SBFD symbols or one or more SBFD symbols, and wherein the another SRS is transmitted using the first TCI state and using a transmission power that is determined based on one or more power control parameters associated with the first TCI state.

3. The WTRU of claim 1, the processor and the transceiver configured to transmit a physical random access channel (PRACH) transmission using one or more non-SBFD symbols or using one or more SBFD symbols, wherein the PRACH transmission uses the first TCI state and a transmission power that is determined based on one or more power control parameters associated with the first TCI state.

4. The WTRU of claim 1, the processor and the transceiver configured to receive information indicating a first unified TCI (UTCI) state instance and a second UTCI state instance, wherein the first UTCI state instance is associated with a first set of physical channels or signals and the second UTCI state instance is associated with a second set of physical channels or signals.

5. The WTRU of claim 1, the processor and the transceiver configured to transmit the SRS using the first TCI state or the second TCI state after a beam application time has elapsed.

6. The WTRU of claim 1, the processor configured to determine an ordered position of the first TCI state or the second TCI state.

7. The WTRU of claim 1, wherein the transmission power that is determined based on the one or more power control parameters associated with the second TCI state is determined at least in part to reduce non-negligible self-interference with downlink transmissions that overlap in time with the SRS transmission.

8. The WTRU of claim 1, the processor configured to utilize the first TCI or the second TCI state based on a received downlink control information (DCI).

9. The WTRU of claim 1, the processor and the transceiver configured to receive second configuration information indicating a first TCI codepoint, wherein the first TCI codepoint is associated with the first TCI state and the second TCI state; and
  the processor configured to determine that the first TCI codepoint is to be applied.

10. A method performed by a wireless transmit/receive unit (WTRU), the method comprising:
  receiving first configuration information indicating at least a first sounding reference signal (SRS) resource set, a first transmission configuration indication (TCI) state, and a second TCI state, wherein the first SRS resource set provides one or more transmission occasions, wherein each of the one or more transmission occasions comprise one or more symbols;
  determining that the first TCI state is associated with a non-subband overlapping full-duplex (SBFD) mode of operation and the second TCI state is associated with an SBFD mode of operation; and transmitting an SRS using a transmission occasion of the first SRS resource set, wherein:

when the transmission occasion comprises one or more non-SBFD symbols, the SRS is transmitted using the first TCI state and using a transmission power that is determined based on one or more power control parameters associated with the first TCI state; and when the transmission occasion comprises one or more SBFD symbols, the SRS is transmitted using the second TCI state and using a transmission power that is determined based on one or more power control parameters associated with the second TCI state.

11. The method of claim 10, comprising receiving configuration information indicating a second SRS resource set, wherein the second SRS resource set is associated with at least one of a beam management or antenna switching transmission method, and transmitting another SRS using a transmission occasion of the second SRS resource set, wherein the SRS transmission of the another SRS uses one or more non-SBFD symbols or one or more SBFD symbols, and wherein the another SRS is transmitted using the first TCI state and using a transmission power that is determined based on one or more power control parameters associated with the first TCI state.

12. The method of claim 10, comprising transmitting a physical random access channel (PRACH) transmission using one or more non-SBFD symbols or using one or more SBFD symbols, wherein the PRACH transmission uses the first TCI state and a transmission power that is determined based on one or more power control parameters associated with the first TCI state.

13. The method of claim 10, further comprising receiving information indicating a first unified TCI (UTCI) state instance and a second UTCI state instance, wherein the first UTCI state instance is associated with a first set of physical channels or signals and the second UTCI state instance is associated with a second set of physical channels or signals.

14. The method of claim 10, comprising transmitting the SRS using the first TCI state or the second TCI state after a beam application time has elapsed.

15. The method of claim 10, comprising determining an ordered position of the first TCI state or the second TCI state.

16. The method of claim 10, wherein the transmission power that is determined based on the one or more power control parameters associated with the second TCI state is determined at least in part to reduce non-negligible self-interference with downlink transmissions that overlap in time with the SRS transmission.

17. The method of claim 10, comprising utilizing the first TCI state or the second TCI state based on a received downlink control information (DCI).

18. The method of claim 10, comprising:

receiving second configuration information indicating a first TCI codepoint, wherein the first TCI codepoint is associated with the first TCI state and the second TCI state; and determining that the first TCI codepoint is to be applied.

* * * * *